United States Patent [19]
Seufer

[11] Patent Number: 5,816,466
[45] Date of Patent: Oct. 6, 1998

[54] WIRE FEEDING APPARATUS

[75] Inventor: Lee E. Seufer, Chardon, Ohio

[73] Assignee: The Lincoln Electric Company, Cleveland, Ohio

[21] Appl. No.: 635,021

[22] Filed: Apr. 19, 1996

[51] Int. Cl.[6] .......................... B65H 20/00; B65H 57/04
[52] U.S. Cl. .................. 226/187; 226/196.1; 242/615.3
[58] Field of Search ................................. 226/108, 186, 226/187, 188, 189, 196, 199; 242/157 R, 615.3

[56] References Cited

U.S. PATENT DOCUMENTS

| | | | |
|---|---|---|---|
| 2,754,958 | 7/1956 | Murrell et al. | 226/196 |
| 2,786,674 | 3/1957 | Heijnis et al. | 226/196 |
| 3,430,832 | 3/1969 | Meyer | 226/196 |
| 3,553,423 | 1/1971 | Doxey | 219/130 |
| 3,562,577 | 2/1971 | Kensrue | 314/71 |
| 3,722,772 | 3/1973 | Flowers et al. | 226/196 |
| 3,883,061 | 5/1975 | Thor | 226/154 |
| 3,898,419 | 8/1975 | Smith | 219/130 |
| 4,098,445 | 7/1978 | Samokovliski et al. | 226/186 |
| 4,150,772 | 4/1979 | Auer | 226/90 |
| 4,205,771 | 6/1980 | Samokovliski et al. | 226/90 |
| 4,354,626 | 10/1982 | Brandewie et al. | 226/196 |
| 4,426,046 | 1/1984 | Heuckroth | 242/181 |
| 5,072,872 | 12/1991 | Casset et al. | 226/186 |
| 5,309,603 | 5/1994 | Oexler et al. | 226/199 |
| 5,497,928 | 3/1996 | Burns et al. | 226/186 |
| 5,521,355 | 5/1996 | Lorentzen | 219/137.7 |
| 5,584,648 | 12/1996 | Camelli et al. | 226/199 |

*Primary Examiner*—Charles A. Marmor
*Assistant Examiner*—Matthew A. Kaness
*Attorney, Agent, or Firm*—Vickers, Daniels & Young

[57] ABSTRACT

Apparatus is provided for feeding consumable welding electrode wire from a supply reel to a welding gun and comprises pairs of drive roll and drive gear assemblies associated with a wire guide plate assembly for feeding the wire along a linear path through the apparatus. The drive rolls are removably mounted on corresponding support shaft structures by a split snap ring component. The guide plate assembly comprises a guide plate having a guide slot milled therein and a cover plate overlying the slot to provide a wire guide passageway through the apparatus which is constantly linear and aligned with the wire drive rolls. A spring biased force transmitting assembly is associated with the support shaft structure for the upper drive roll and drive gear of each pair for adjusting the driving engagement between the drive rolls and a wire therebetween, and the force transmitting components are mounted on a pivotal arm and cover displaceable between closed and opened positions in which the force transmitting assemblies are respectively in operative and inoperative positions relative to the upper drive roll and drive gear assemblies. In the open position of the pivotal arm and cover, the drive rolls and drive plate assembly are accessible for removal and replacement.

104 Claims, 16 Drawing Sheets

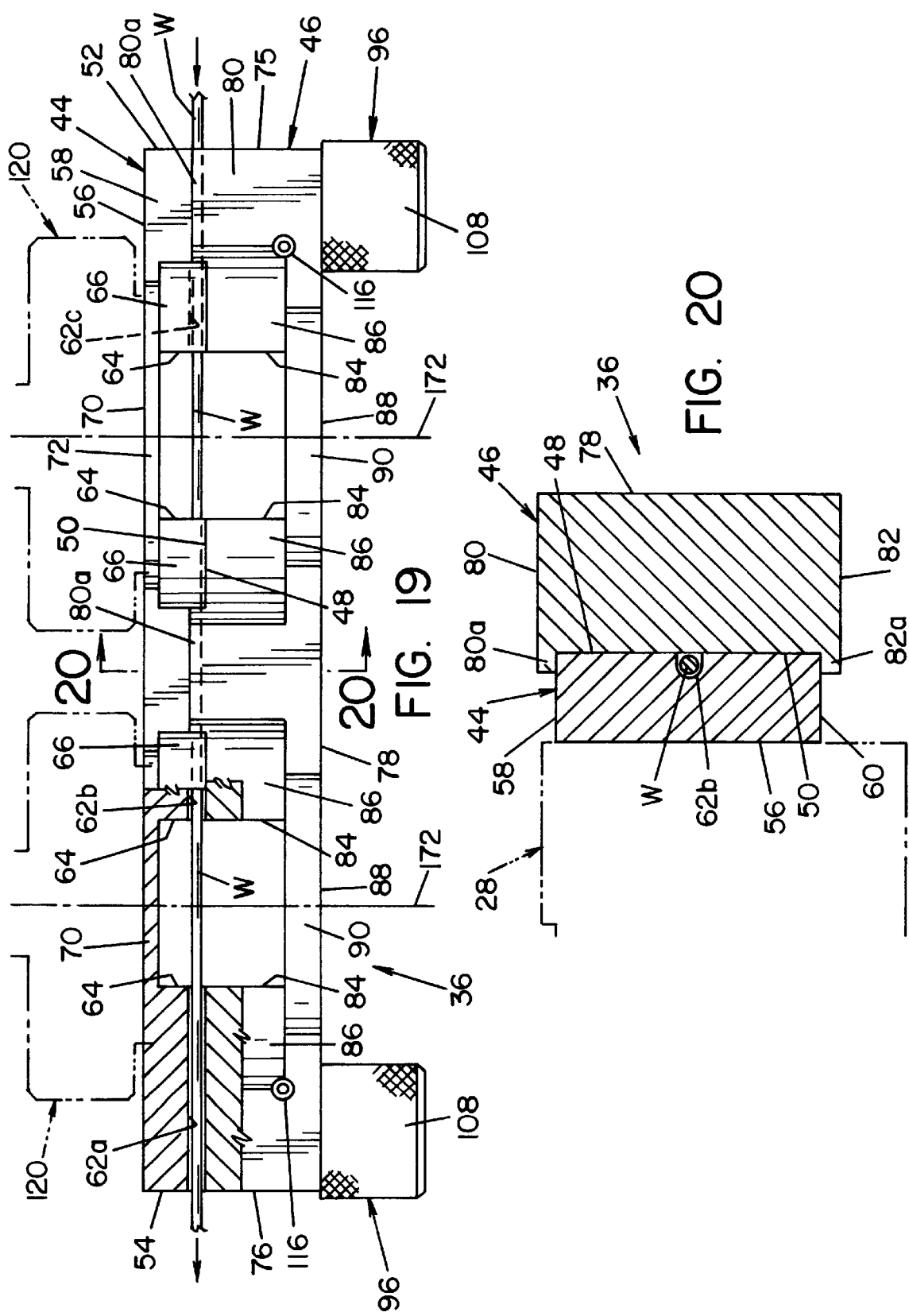

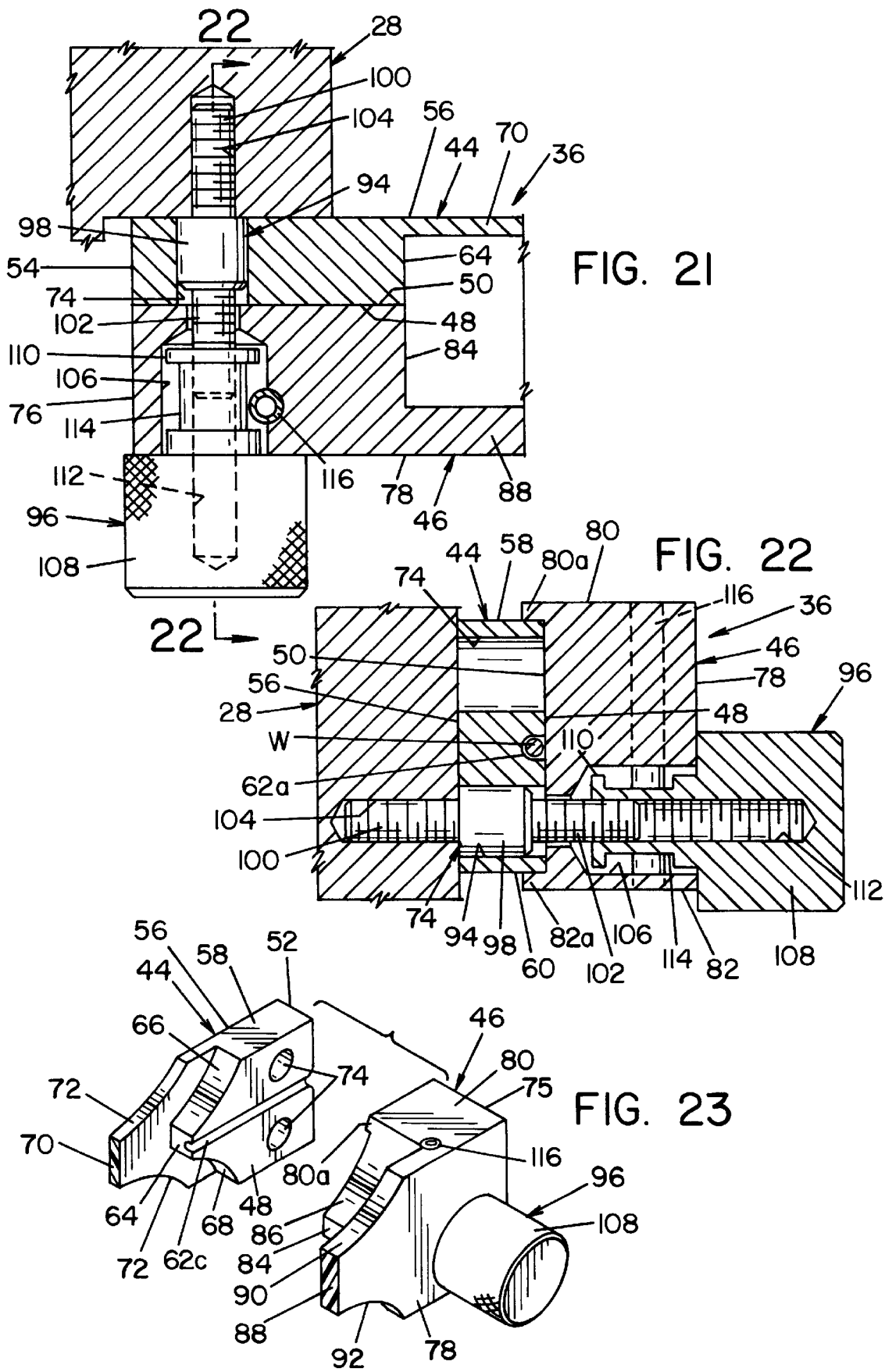

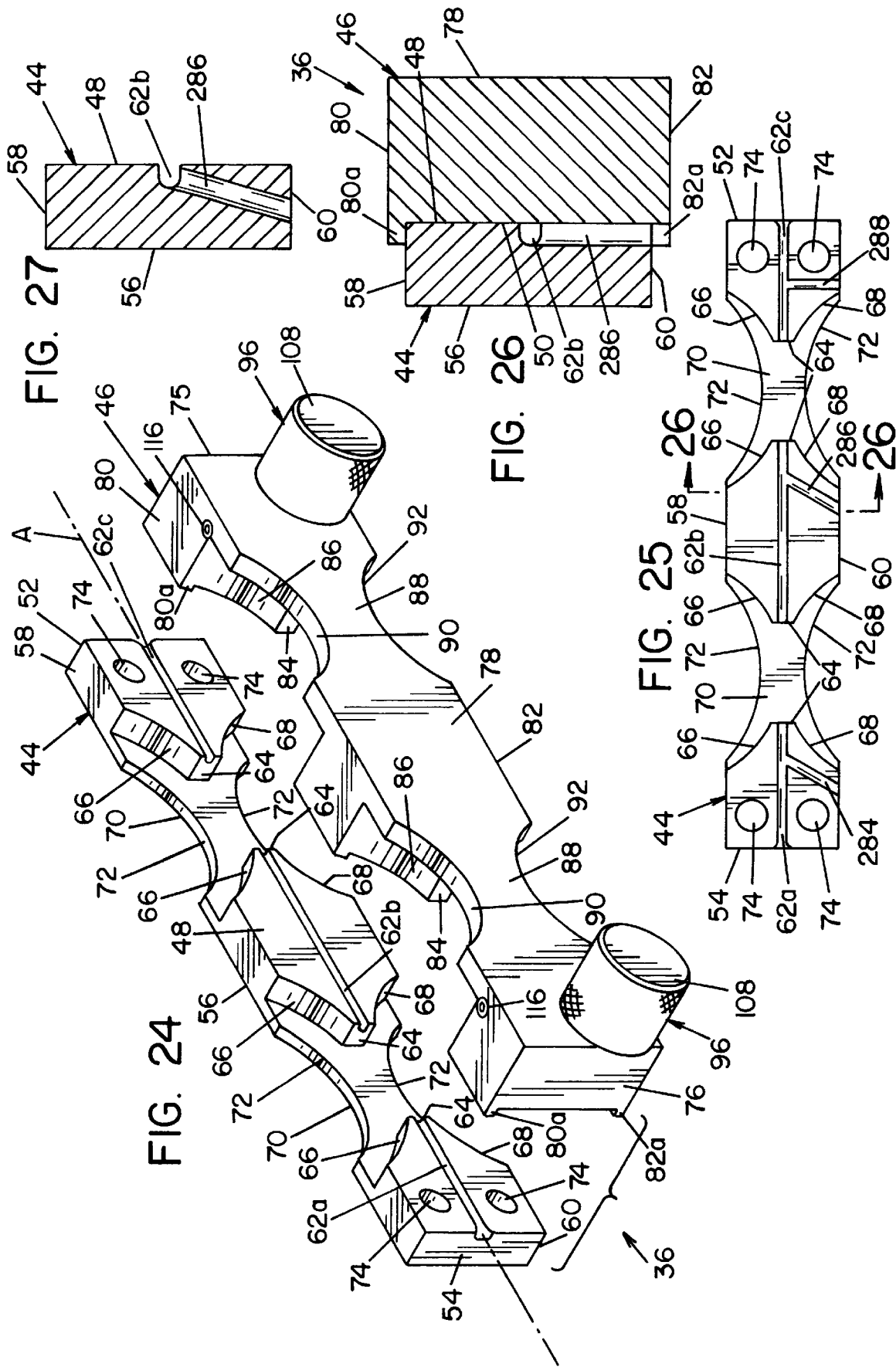

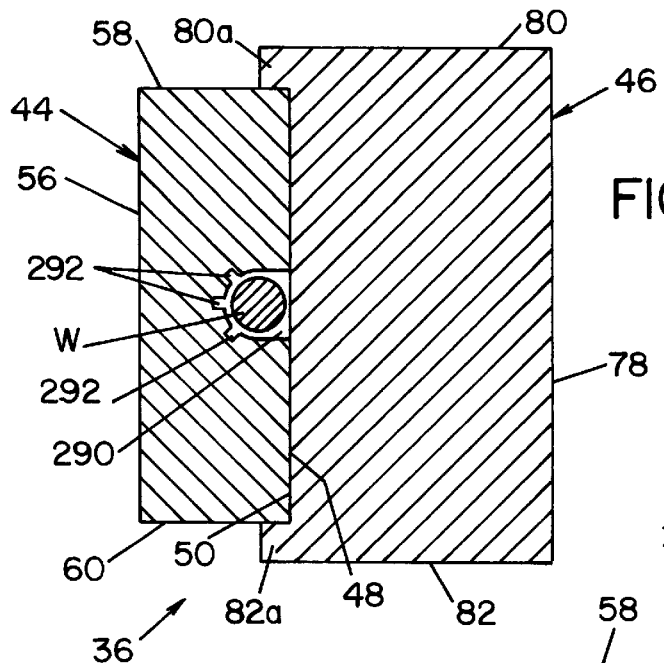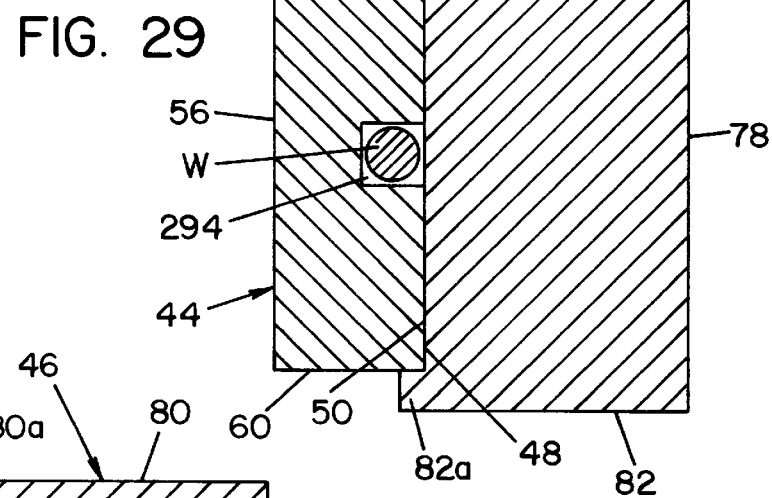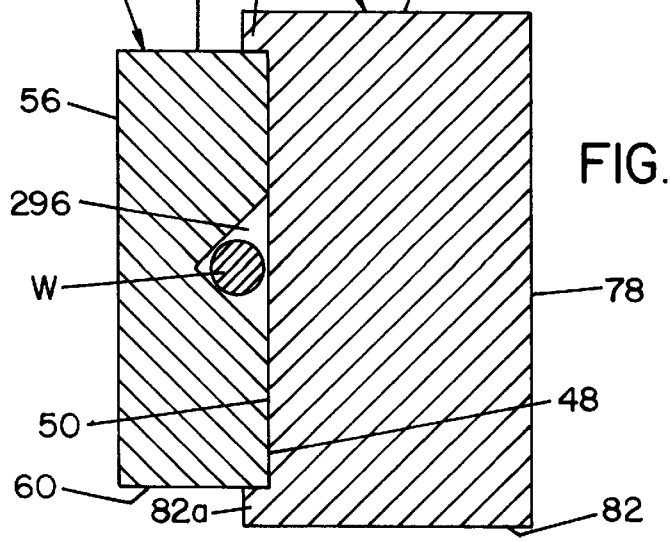

WIRE FEEDING APPARATUS

BACKGROUND OF THE INVENTION

The present invention relates to the art of wire feeding apparatus and, in particular, to apparatus for feeding consumable electrode wire from a supply reel to a welding gun.

While the present invention finds particular utility in conjunction with feeding consumable electrode wire to a welding gun and will be described herein in connection with such use, it will be appreciated that the invention is applicable to the feeding of wire other than welding electrode wire and the feeding of wire in conjunction with the operation of apparatus other than welding apparatus.

Wire feeding apparatus for moving consumable electrode wire from a supply reel to a welding gun is of course well known and, generally, comprises motor driven drive rolls engaging diametrically opposite sides of the wire to move the wire along a path through the feeding apparatus and thence through a flexible tube or conduit leading to the welding gun and which conduit can also carry shielding gas and electrical current to the welding gun. The drive rolls may be a single pair of rolls or a double pair spaced apart along the path through the wire feeding apparatus and, in either event, the drive roll arrangement has upstream and downstream sides with respect to the direction of movement of the wire therethrough. The wire enters the bite between the drive rolls on the upstream side through a guide tube and exits through a guide tube adjacent the downstream side of the guide roll arrangement and, if the guide roll arrangement includes spaced apart pairs of guide rolls, the wire passes through a guide tube between the downstream side of one pair and the upstream side of the second pair. The wire feeding apparatus may also include an arrangement for biasing at least one of the drive rolls of each pair toward the other to promote driving contact with the wire therebetween.

A number of problems are attendant to the structure and operation of such wire feeding apparatus heretofore provided, none the least of which is known in the art as bird-nesting. Bird-nesting occurs in the wire feeding apparatus when the resistance to wire movement therethrough is such that the driving force on the wire overcomes the columnar strength of the wire causing the wire to collapse in the area between the point of high resistance and the driving force. The columnar strength of the wire varies in accordance with the wire material and the wire diameter. In this respect, for example, steel wire has a higher columnar strength than aluminum wire, and larger diameter wire has a higher columnar strength than a smaller diameter wire of the same material. Bird-nesting is costly both from the standpoint of the down time of the welding apparatus required to clear the bird-nested wire and re-feed the welding wire through the feeding apparatus to the torch, and from the cost of the welding wire lost by such bird-nesting.

In wire feeding apparatus heretofore available, the resistance to wire movement and thus the occurrence of bird-nesting can result from clogging of the wire passageway through the guide tubes and/or the inability to obtain and maintain coaxial alignment of the guide tubes through the feeding apparatus. More particularly in this respect, the guide tubes are removably supported on the wire feeding apparatus to facilitate the removal and cleaning or replacement thereof and, since the guide tubes are individual components separate from one another, it is extremely difficult to obtain coaxial alignment therebetween both during manufacture of the wire feeding apparatus and in conjunction with removal and replacement of the guide tubes such as for maintenance purposes. Further in connection with replacing such guide tubes, and especially a guide tube located in the space between two pairs of drive rolls, it is very difficult to position the ends of the guide tubes relative to the bites of the drive rolls, whereby a large gap can be created between the end of a guide tube and the associated roll bite, thus promoting bird-nesting in the area of the gap. Misalignment of the guide tubes, which may be the result of either a lateral offset or an angular offset between the axes thereof, imposes a resistance to the movement of wire through the feeding apparatus and, if the offset is sufficient, can alone cause bird-nesting. Further, movement of the wire through the guide tubes, even if the latter are generally in alignment with one another, results in abrasion which leaves wire residue in the guide tube passageways which, ultimately, builds up therein and produces a restriction and thus resistance to wire movement which can cause bird-nesting. Still further, such abrasion of the wire and ultimate restriction of the guide tube passageways is promoted by misalignment between the guide tubes. Clogging of the guide tubes necessitates the removal and cleaning or replacement thereof and, since the guide tubes are individual components, the removal and cleaning or replacement thereof is a time consuming and thus expensive operation in that the welding apparatus is necessarily shut down during such maintenance operations. Partly in this respect, access to some or all of the guide tubes requires removal of the drive rolls. Cleaning of clogged guide tubes once removed is especially problematic in that the residue build up therein often requires a drilling operation to clear the passageways therethrough. Such drilling can affect the axis of the guide tube, further adding to the difficulty of obtaining alignment between adjacent tubes.

Other problems and disadvantages attendant to the structure and operation of wire feeding apparatus heretofore available include the time and cost required to adapt the apparatus to accommodate wire having different diameters. In this respect, in prior wire feeding apparatus wherein the wire driving rolls have opposed peripheral grooves for accommodating the wire to be driven thereby, the grooves are cooperatively of a diameter to accommodate a corresponding wire diameter. Therefore, if a larger or smaller diameter wire is to be used with the welding apparatus, the drive rolls have to be changed. Heretofore, the drive rolls have been bolted, screwed or otherwise mounted to their supporting shaft structure such that removal thereof is time consuming and can be difficult, thus adding to the down time of the welding apparatus. Moreover, the spring biasing arrangements provided for biasing one of the drive rolls toward the other are inefficient with respect to optimizing the spring force application and, in connection with feeding apparatus having two pairs of drive rolls, the biasing arrangements have to be individually adjusted. This makes it extremely difficult to obtain the same force of engagement of the drive rolls of the two sets with the wire. Furthermore, the biasing arrangements are structurally associated with the feeding apparatus and drive rolls such that they structurally incumber access to and removal of the drive rolls. Further adding to the maintenance costs in connection with wire feeding apparatus heretofore available is the fact that the foregoing and other component parts thereof are not readily accessible and/or removable in connection with performing maintenance and/or replacement operations with respect thereto.

SUMMARY OF THE INVENTION

In accordance with the present invention, wire feeding apparatus is provided which advantageously minimizes and/ or overcomes the foregoing and other problems and disadvantages attendant to the structure and operation of wire feeding apparatus heretofore available. In this respect, and in accordance with one aspect of the invention, wire feeding apparatus is provided with a guide plate structure which assures obtaining and constantly maintaining linearity of the wire guide passageway through the apparatus with minimal, constant axial clearance between the entrance and exit ends of the passageway and the corresponding drive roll bite, and alignment of the passageway with the drive rolls, thus to optimize the preclusion of bird-nesting as the wire is driven through the wire feeding apparatus. Preferably, the guide plate assembly includes plate members having facially engaging inner surfaces, one of which is machined to provide a wire receiving guide slot and the other of which covers the slot to provide the guide passageway therewith. The guide plate assembly is removably mounted on a support member of the wire feeding apparatus, whereby the plates can be separated and the guide slot readily cleaned to avoid the build up of residue therein. Furthermore, the guide plates are structured and structurally interrelated as a unit with the support member in a manner which assures proper orientation of the wire passageway relative to drive rolls of the apparatus each time the guide plate assembly is removed and replaced. With further regard to the guide plate assembly, the wire passageway therethrough can be provided with discharge passages communicating the latter with atmosphere so that residue in the wire passageway can be discharged therefrom during operation of the apparatus to retard the accumulation of residue in the passageway.

In accordance with another aspect of the invention, a mounting arrangement is provided for the wire driving rolls by which the latter can be quickly removed and replaced relative to the supporting structure therefor. More particularly in this respect, the wire driving rolls are mounted on a support shaft structure through the use of a split snap ring arrangement which provides for quickly and easily connecting and disconnecting the drive rolls relative to the shaft structure. Preferably, a drive roll and corresponding drive gear are axially slidably received on opposite ends of an annular collar coaxial with the support shaft structure and with which the drive roll and gear are interengaged so as to preclude relative rotation therebetween. This mounting arrangement provides, selectively, for removal of the drive roll independent of the corresponding drive gear or removal of the drive roll and drive gear as a unit with the corresponding support shaft structure. Further in accordance with this aspect of the invention, the support shaft structure for one of the drive rolls and drive gear assemblies is mounted for pivotal displacement from an orientation parallel to the support shaft structure of the other roll and gear assembly to an angular orientation relative to the latter, thus accommodating access to the guide plate assembly and the drive rolls in connection with removal thereof from the support structure therefor.

In accordance with yet another aspect of the invention, the drive rolls of wire feeding apparatus are provided with axially adjacent circumferential wire driving grooves each adapted to accommodate a different diameter wire. Complementary ones of the grooves on the drive rolls are aligned with the feed path of the wire through the apparatus, and the drive rolls are reversely mountable on their support shaft structures to position the other of the complementary grooves in alignment with the wire feed path. Accordingly, in connection with this aspect of the invention, a single set of drive rolls can accommodate two different diameters of wire to be fed through the apparatus simply by reversing the orientation of the drive rolls relative to their support structure. At the same time, it will be appreciated that the rolls can be provided with pairs of driving grooves of the same size to accommodate wire of the same diameter, whereby the life of the drive rolls is increased. In either event the quick connect-disconnect arrangement mentioned above minimizes down time in conjunction with reversing the drive rolls.

In accordance with yet a further aspect of the invention, an improved adjustable force transmitting arrangement is provided for biasing one of a pair of wire drive rolls toward the other for adjusting the driving engagement of the rolls with the wire therebetween. Further in accordance with this aspect of the invention, the one drive roll is mounted on a support shaft structure including a cantilevered shaft member having a supported end and an unsupported end which extends outwardly of the drive roll. An adjustable biasing force is applied against the unsupported end of the roll shaft to bias the latter and thus the one drive roll toward the other. Preferably, the biasing force is applied to the unsupported end of the roll shaft through a lever arrangement which optimizes the transfer of force from a corresponding biasing spring to the shaft. The applied force of the biasing spring to the lever arrangement is manually adjustable and, in connection with feeding apparatus having two sets of drive rolls, such adjustment of both force transmitting arrangements is simultaneously achieved through a common adjusting member. Preferably in accordance with this aspect of the invention, the component parts of the adjustable force transmitting arrangement are mounted on an arm by which the component parts are pivotal between operative and inoperative positions relative to the unsupported end of the roll shaft. In the operative position, a force transmitting component on the lever engages the unsupported end of the roll shaft, and in the inoperative position, the arm and force transmitting components are positioned so as to optimize access to the drive roll units and guide plate assembly of the apparatus. Preferably, the pivotal arm is in the form of a cover which, when in the operative position of the force transmitting arrangement, covers the drive rolls and guide plate assembly, and the unsupported outer end of the roll shaft is provided with a force transmitting member which is beveled and provided with an annular recess adjacent the inner end of the bevel. The latter provides for the force transmitting component on the lever to engage the beveled surface during movement of the arm to the operative position and to engage in the groove, whereby the force transmitting component releasably holds the arm and thus the force transmitting arrangement in the operative position.

The wire feeding apparatus is adapted to be rotatably adjustably mounted on a tubular sleeve which is coaxial with the output shaft of a motor driven gear box by which the drive gears are rotated. The structure and structural interrelationship between the component parts of the wire feeding apparatus is such as to optimize the compactness thereof as well as the ability to readily access the component parts and remove the same in connection with the performance of maintenance and replacement operations, cleaning of the wire guide plate assembly and reversal of the wire drive rolls.

It is accordingly an outstanding object of the present invention to provide improved wire feeding apparatus of the character comprising wire driving rolls associated with a structural arrangement providing a wire guide passageway through the apparatus.

Another object is the provision of apparatus of the foregoing character having a wire guide arrangement which assures obtaining and constantly maintaining linearity of the wire guiding passageway through the apparatus and alignment of the passageway with the wire drive rolls.

Yet another object is the provision of apparatus of the foregoing character in which component parts providing the wire guiding passageway are readily removable for cleaning and are structured and structurally interrelated with one another and with support components of the apparatus to assure appropriate alignment of the wire guiding passageway with the drive rolls when disassembled and reassembled with the support components.

Still another object is the provision of apparatus of the foregoing character in which the wire guide arrangement comprises guide plates having planar inner surfaces one of which is provided with a wire guide slot and the other of which covers the slot to provide the wire guide passageway therewith.

A further object is the provision of apparatus of the foregoing character in which the drive rolls are removably mountable on support shaft structures therefor by means of a quick release split spring ring arrangement.

Yet a further object is the provision of apparatus of the foregoing character in which one of a pair of drive rolls is displaceable away from the other to facilitate access to the wire guide assembly and drive rolls for removal thereof.

Still another object is the provision of apparatus of the foregoing character having an improved arrangement by which the drive rolls and corresponding drive gears are mounted on a common support which is removable as a unit with a support shaft structure therefor and from which the drive rolls are selectively removable independent of the drive gears.

A further object is the provision of apparatus of the foregoing character in which one of a pair of drive rolls is supported on a shaft structure having an unsupported end extending outwardly from the one roll and against which an adjustable force is imposed to bias the one roll toward the other in connection with adjusting the driving engagement of the rolls with the wire therebetween.

Another object is the provision of apparatus of the foregoing character in which the transmission of force to the unsupported end of the roll shaft is through an improved spring biased lever arrangement in which the biasing force of the spring against the lever is manually adjustable.

Yet another object is the provision of apparatus of the foregoing character wherein the adjustable force transmitting components are mounted on a pivotal arm and include a component interengaging with the unsupported end of the roll shaft to releasably hold the arm in an operative position from which the arm is releasable and displaceable to an inoperative position in which the drive rolls, their support shaft structures and the wire guide assembly are readily accessible.

A further object is the provision of apparatus of the foregoing character wherein the pivotal arm is in the form of a cover which, in the operative position of the force transmitting arrangement, covers and protects the drive rolls, wire guide assembly and force transmitting components.

Still another object is the provision of apparatus of the foregoing character which is structurally compact and in which the component parts are readily accessible and easily and quickly removable for maintenance and/or replacement purposes.

BRIEF DESCRIPTION OF THE DRAWINGS

The foregoing objects, and others, will in part be obvious and in part pointed out more fully hereinafter in conjunction with the written description of preferred embodiments of the invention illustrated in the accompanying drawings in which:

FIG. 19 is a plan view, partially in section, of the wire guide plate assembly taken along line 19—19 in FIG. 7;

FIG. 20 is a cross-sectional elevation view of the guide plate components taken along line 20—20 in FIG. 19;

FIG. 21 is a plan view in section showing the guide plate assembly mounting arrangement;

FIG. 22 is a cross-sectional elevation view taken along line 22—22 in FIG. 21;

FIG. 23 is a perspective view of end portions of the plates of the guide plate assembly;

FIG. 24 is a perspective view of the guide plate and cover plate components of the guide plate assembly in disassembled relationship;

FIG. 25 is an elevation view of a guide plate modified to have discharge passageways;

FIG. 26 is a cross-sectional elevation view of the guide plate shown in FIG. 25 taken along line 26—26 in FIG. 25 and showing the guide plate in assembled relationship with a cover plate;

FIG. 27 is a cross-sectional elevation view of a guide plate showing a modification of the discharge passageway;

FIGS. 28–30 are cross-sectional elevation views of the guide plate assembly showing modifications of the wire guiding slot in the guide plate.

DESCRIPTION OF PREFERRED EMBODIMENTS

Figure 1:
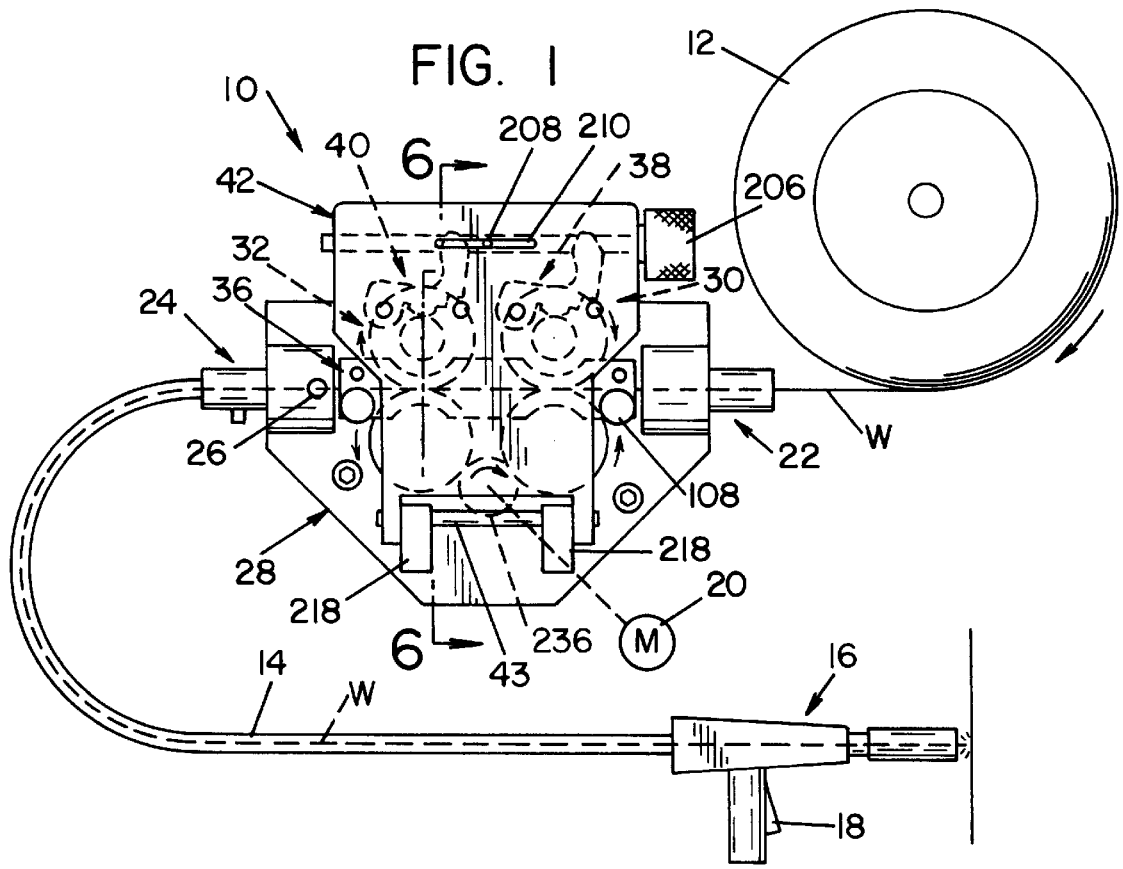
FIG. 1 is a front elevation view showing wire feeding apparatus according to the present invention associated with a wire supply reel and welding gun.

Referring now in greater detail to the drawings wherein the showings are for the purpose of illustrating preferred embodiments of the invention only and not for the purpose of limiting the invention, wire feeding apparatus 10 according to the present invention, as illustrated in FIG. 1, is adapted to receive wire W from a welding wire supply reel 12 and to feed the wire through a flexible tube or conduit 14 to a welding gun 16 having a trigger 18 by which the welding operation including the feed of wire W to the gun is controlled. In this respect, trigger 18 controls actuation of an electric motor 20 by which drive rolls in wire feeding apparatus 10 are rotated as described in detail hereinafter to move wire W through the feeding apparatus to gun 16. The feeding apparatus has an upstream end 22 into which wire W is fed from reel 12 and a downstream end 24 in the form of a nipple to which conduit 14 is suitably coupled. In the embodiment illustrated, the feeding apparatus is provided with an opening 26 at the downstream end thereof for introducing a suitable shielding gas into conduit 14 which, as well known and not shown, is also adapted to supply welding current to gun 16. The major component parts of feed apparatus 10 which are described in greater detail hereinafter include a support block member 28, first and second pairs of upper and lower drive roll and drive gear units 30 and 32, respectively, driven by a pinion gear 236 which is driven by motor 20, a wire guide plate assembly 36, and first and second adjustable force transmitting lever arrangements 38 and 40 respectively associated with drive roll and drive gear units 30 and 32. The force transmitting arrangements are mounted on a pivotal arm 42 which, in the operative position of the force transmitting components shown in FIG. 1, covers the outer sides of guide plate assembly 36 and drive roll and drive gear units 30 and 32.

Figure 2:
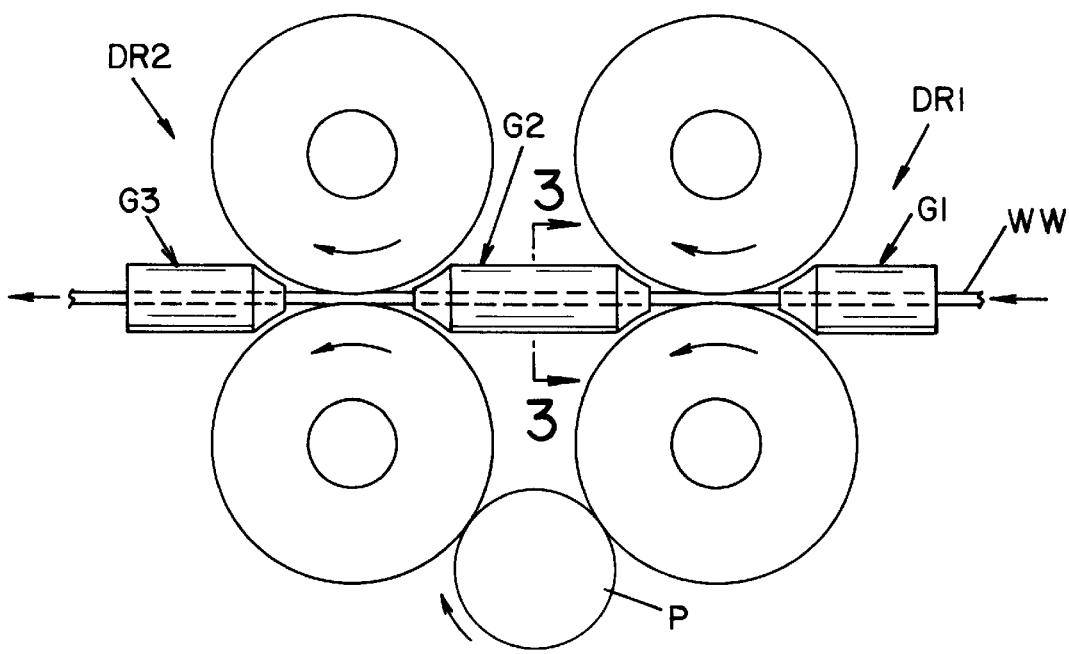
FIG. 2 is a schematic illustration of the drive rolls and tubular wire guiding components of prior art wire feeding apparatus.
Figure 3:
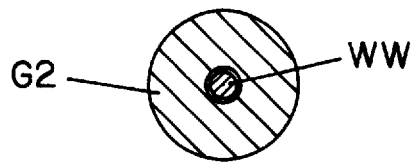
FIG. 3 is a cross-sectional view of a prior art wire guide component taken along line 3—3 in FIG. 2.
Figure 4:
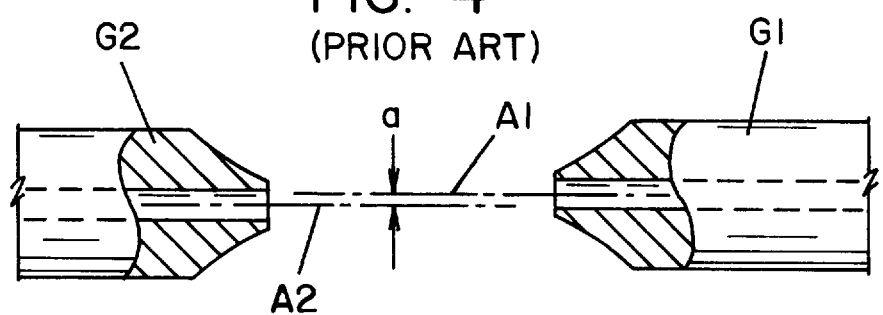
FIG. 4 schematically illustrates prior art tubular wire guiding components in which the axes are laterally offset.
Figure 5:
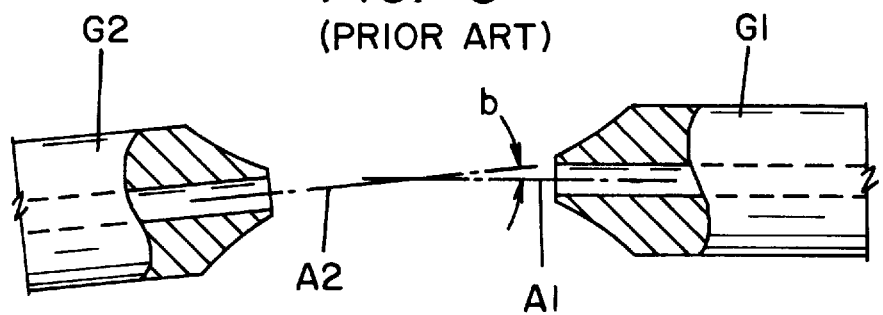
FIG. 5 illustrates prior art tubular wire guiding components in which the axes are angularly offset.

FIGS. 2–5 of the drawings schematically illustrate a prior art structural arrangement for guiding welding wire through wire feeding apparatus and which creates and promotes problems, namely bird-nesting, which are advantageously minimized or overcome in accordance with one aspect of the present invention as described hereinafter. As shown in FIG. 2, first and second pairs of wire driving rolls DR1 and DR2 engage diametrically opposite sides of welding wire WW and are driven by a pinion P to move the wire from right to left in FIG. 2. Tubular wire guiding components G1, G2 and G3 of hardened steel are associated with the bites of the pairs of drive rolls for guiding the welding wire through the feeding apparatus. While not shown, the guide components are removably mounted in bores of support components of the feeding apparatus such as by mounting bolts engaging the components transversely in the bores, and the guide components are removable to facilitate cleaning and/or replacement thereof. Cleaning is a difficult task due to the closed tubular structure of the guide components. Indeed, it is often necessary to drill the wire opening through the guide components in order to remove wire residue which accumulates on the wall of the opening. Moreover, since the guide components are structurally independent of one another and are engaged in corresponding bores in the feeding apparatus under a transverse force imposed thereon by the mounting bolts, it is difficult to obtain and/or maintain the desired coaxial alignment thereof in connection with the mounting, removal and remounting of the guide components on the feeding apparatus. Thus, as depicted in FIGS. 4 and 5 with regard to guide components G1 and G2, the axes A1 and A2 thereof may be misaligned by a lateral offset a therebetween or by an angular offset b therebetween. In either event, such misalignment creates resistance to movement of the welding wire through the feeding apparatus and shaving of the wire and clogging of the opening which can result in bird-nesting. For example, with regard to the offsets shown in FIGS. 4 and 5 and the location of guide components G1 and G2 in FIG. 2, the offset would create a resistance to movement of the welding wire through guide component G2 whereby the driving force of drive rolls DR1 would overcome the columnar strength of the welding wire causing bird-nesting in the area between the bite on the downstream side of rolls DR1 and the upstream side of guide component G2. Furthermore, the build up of residue in guide component G2 also restricts the movement of the welding wire therethrough and such residue build up alone can cause bird-nesting and, if coupled with misalignment of the adjacent guide components, can promote an earlier occurrence of bird-nesting than would result from either residue build up or misalignment alone.

Wire guide plate assembly 36 and the mounting thereof in accordance with the present invention assures obtaining and constantly maintaining a linear wire guide passageway through the feeding apparatus and alignment of the passageway with the wire drive rolls of the apparatus. Further, the guide plate assembly is easily removed for cleaning, and these features cooperatively O provide for the incidence of bird-nesting to be eliminated under almost all circumstances. In this respect, with reference to FIGS. 11, 12, 19, 20 and 24 of the drawing, guide plate assembly 36 comprises first and second guide plate members 44 and 46 which can be of a suitable polymeric material such as nylon or a suitable metal such as aluminum or hardened steel. When assembled, as described more fully hereinafter, guide plates 44 and 46 have facially engaging planar inner surfaces 48 and 50, respectively. Guide plate member 44 has longitudinally opposite ends 52 and 54, laterally outer side 56 which is planar and parallel to inner side 48, and top and bottom sides 58 and 60, respectively. A wire receiving guide slot having portions 62a, 62b and 62c is provided in inner surface 48, such as by milling, stamping, molding or casting, and extends between opposite ends 52 and 54 along a linear slot axis A which is centrally between top and bottom sides 58 and 60 of the guide plate member. For the purpose which will become apparent hereinafter, wire drive roll openings are provided through guide plate member 44 between the top and bottom sides thereof, each of which openings includes longitudinally spaced apart end walls 64 intersecting the guide slot in planes transverse to axis A. Each of the drive roll openings further includes upper arcuate walls 66 which, for each drive roll opening, diverge from end walls 64 and intersect top side 58, and lower arcuate walls 68 which, for each drive roll opening, diverge from end walls 64 and intersect bottom side 60. Each drive roll opening is further defined by a laterally outer wall 70 having arcuate upper and lower edges 72 for the purpose which will become apparent hereinafter. The longitudinally opposite ends of guide plate member 44 are each provided with pairs of mounting apertures 74 extending therethrough between inner surface 48 and outer side 56. The apertures of each pair are on opposite sides of the guide slot and equally spaced from axis A for the purpose set forth hereinafter.

Planar inner surface 50 of guide plate member 46 covers the wire guide slot in guide plate member 44, whereby the guide slot and inner surface 50 cooperatively provide a wire guide passageway through the guide plate assembly between the opposite ends thereof Guide plate member 46 has longitudinally opposite ends 75 and 76, laterally outer side 78 and top and bottom sides 80 and 82, respectively, and the latter include corresponding flanges 80a and 82a which extend laterally inwardly across the corresponding one of the top and bottom sides 58 and 60 of guide plate member 44 to vertically align the guide plate members in connection with the assembly and mounting thereof The laterally inner side of guide plate member 46 is complementary with respect to the wire drive roll openings in guide plate member 44 and, in this respect, is provided with a pair of drive roll openings each comprising longitudinally spaced apart end walls 84 coplanar with a corresponding one of the end walls 64 on guide plate 44 member 44. The drive roll openings in guide plate member 46 further include arcuate upper walls 86 each coinciding with the corresponding one of the upper walls 66 of guide plate member 44. While not illustrated, it will be understood that the wire drive roll openings through guide plate member 46 include lower arcuate walls each coinciding with the corresponding one of the lower arcuate walls 68 of guide plate member 44. Further, the drive roll openings through guide plate member 46 include laterally outer walls 88 having arcuate upper and lower sides 90 and 92, respectively.

As will be appreciated from FIGS. 7 and 21–24, guide plate assembly 36 is adapted to be mounted on support block 28 of the wire feeding apparatus by guide pin and fastener assemblies at the longitudinally opposite ends of the guide plate assembly and each of which guide pin and fastener assemblies includes a mounting and guide pin component 94 fastened to support block 28 and a fastener component 96 mounted on guide plate member 46. More particularly in this respect, mounting and guide pin component 94 includes a guide pin portion 98 having coaxial threaded shanks 100 and 102 integral therewith and extending from axially opposite ends thereof Threaded shank 100 is received in a threaded opening 104 provided therefor in support block 28, whereby the mounting and guide pin component is securely fastened to the support block. When so mounted, the guide pin portion 98 is adapted to be received in the lower one of the guide apertures 74 in guide plate member 44 at the corresponding end of the latter, and threaded shank 102 is adapted to extend into a bore 106 provided in guide plate member 46 for fastener component 96. Fastener component 96 includes a knurled operating knob 108 adjacent outer side 78 of guide plate member 46 and a stem 110 extending into the outer end of bore 106 and having an internally threaded bore 112 receiving threaded shank 102 of mounting and guide pin component 94. Thus, it will be appreciated that rotation of knob 106 in the direction to move the latter axially inwardly onto shank 102 provides for clampingly engaging the guide plate assembly against support block 28 and that rotation of knob 108 in the opposite direction provides for releasing guide plate members 44 and 46 for removal from support block 28. Preferably, knob 108 is mounted on guide plate member 46 against axial separation therefrom and, for this purpose, stem 110 is provided adjacent its axially inner end with a circumferentially extending recess 114, and a roll pin 116 is mounted on guide plate member 46 to extend through bore 106 intermediate the opposite ends of recess 114 so as to engage the inner end of the recess and preclude axial separation of fastener 96 from guide plate member 46.

In connection with the mounting of guide plate assembly 36 on support block 28 it is to be noted that the pairs of guide apertures 74 at the opposite ends of guide plate member 44 advantageously provide for the latter guide plate to be oriented relative to guide plate member 46 and the mounting and guide pin components either as shown in FIG. 24 or with guide plate member 44 inverted with respect to the position shown in the latter figure. In this respect, both the guide apertures 74 and the wire drive roll openings therethrough are symmetric with respect to axis A, and the ability to invert guide plate member 44 advantageously facilitates the assembly operation and minimizes assembly time by providing for either of the orientations of guide plate member 44 to provide proper alignment between the guide plate members and the mounting and guide pin components. Moreover, it will be appreciated that guide pin portions 98 of the mounting and guide pin components 94 assure consistently accurate alignment of the wire guiding passageway with the bites of the wire driving rolls so as to maintain a linear path for movement of the wire through the guide plate assembly.

Wire drive roll and drive gear units 30 and 32 referred to hereinabove in connection with FIG. 1 are substantially structurally identical whereby it will be appreciated that the following description with regard to FIGS. 6–17 and in particular with regard to drive roll and drive gear unit 32 is likewise applicable to drive roll and drive gear unit 30. With regard first to FIG. 6, wire drive roll and drive gear unit 32 comprises upper and lower drive roll and drive gear assemblies 32A and 32B, each of which includes a corresponding wire drive roll 118 and drive gear 120 mounted on a common annular support collar 122. As best seen in FIGS. 6, 8, 9, 13 and 14, collar 122 has axially inner and outer ends, not designated numerically, and a radially outwardly extending flange 124 intermediate the opposite ends thereof. Drive roll 118 is axially slidably received on the outer end of collar 122 and is removably retained thereon as set forth more fully hereinafter, and drive gear 120 is axially slidably received on the inner end of collar 122 and is staked to the sleeve by a plurality of stakes 126 extending therebetween. The inner end of support collar 122 is provided with radially outwardly extending lobes 128 circumferentially spaced apart about the collar and extending axially between flange 124 and the innermost end of the collar. Lobes 128 are arcuate in cross-section, and the inner surface of the bore through gear 120 is provided with correspondingly contoured and positioned recesses 130 which receive lobes 128 to preclude relative rotation between gear 120 and collar 122. Similarly, the axially outer end of collar 122 is provided with a plurality of lobes 132 circumferentially spaced apart about the periphery of the collar and circumferentially offset relative to lobes 128. The inner surface of the bore through drive roll 118 is provided with correspondingly located and contoured recesses 134 which receive lobes 132 to preclude relative rotation between drive roll 118 and support collar 122.

Figure 13:
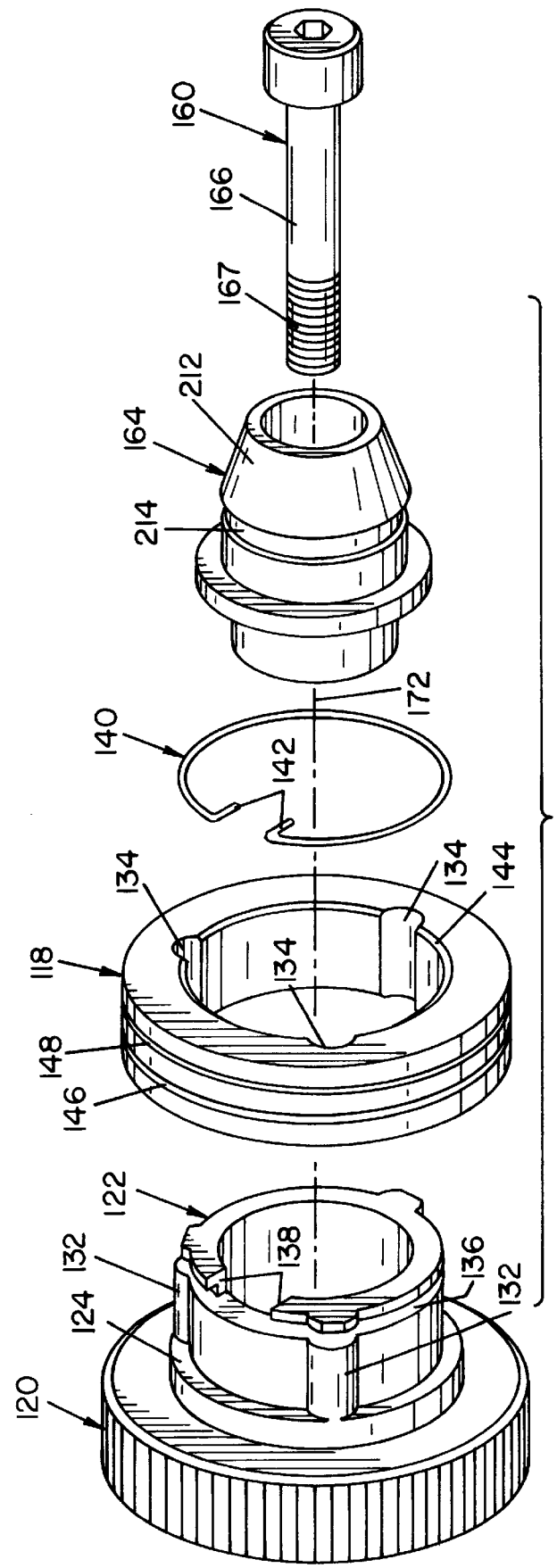
FIG. 13 is an exploded perspective view of the component parts of one of the upper gear, drive roll and support shaft assemblies.
Figure 14:
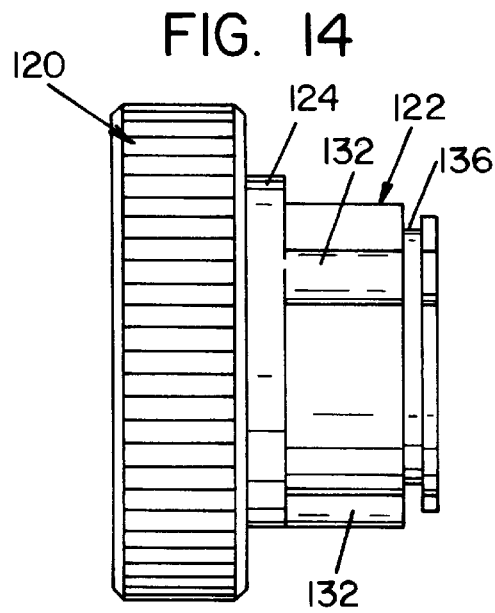
FIG. 14 is a side elevation view showing the drive gear-drive roll support collar with the drive gear thereon.
Figure 15:
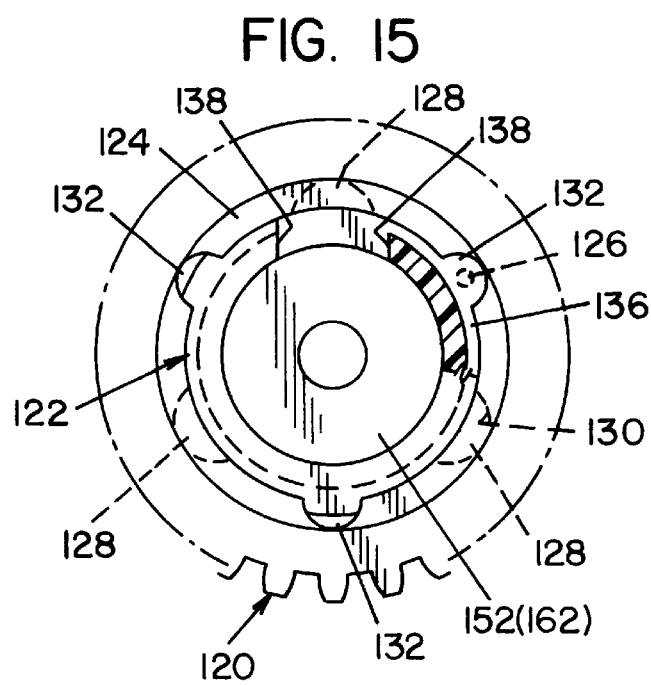
FIG. 15 is an end elevation view, partially in section, looking from right to left in FIG. 14.

The axially outer end of support collar 122 is provided with a circumferentially extending snap ring recess 136 having opposite ends defined by walls 138 which are circumferentially spaced apart and intersect recess 136 for the reason set forth hereinafter. Wire drive roll 118 is removably mounted on the axially outer end of support collar 122 by means of a split spring ring 140 having axially opposite ends defined by circumferentially spaced apart fingers 142 lying in the plane of the ring. Ring 140 is adapted to be received in ring recess 136 with fingers 142 engaging the corresponding one of the end walls 138. Spring 140 has a spring bias in the direction to circumferentially expand the ring whereby fingers 142 engage walls 138 to limit such expansion. The axially opposite ends of the bore through drive roll 118 are provided with a chamfer 144, and when the drive roll is moved axially onto the outer end of collar 122 the chamfer on the axially inner side of the drive roll cams ring 140 radially inwardly to allow the drive roll to pass thereacross. When the inner end of the drive roll abuts against flange 124, split ring 140 expands to engage against chamfer 144 on the axially outer end of the drive roll to axially retain the drive roll on the support collar. By displacing fingers 142 of spring 140 circumferentially toward one another, or by pulling drive roll 118 axially outwardly, the spring is constricted radially inwardly of recess 136 to release drive roll 118 for removal from the support collar. In accordance with one aspect of the invention, drive roll 118 is provided with axially spaced apart peripherally extending wire receiving grooves 146 and 148 each adapted to accommodate a different diameter wire to be driven by the feeding apparatus, and the quick release and remounting feature described above with respect to drive roll 118 advantageously facilitates removing and reversing the orientation of drive roll 118 on support collar 122 for a desired one of the grooves 146 and 148 to be in alignment with the wire guiding passageway provided by guide plate assembly 36. In this respect, for example, the axially inner groove 146 on drive roll 118 as shown in FIG. 13 of the drawing would be in alignment with the wire passageway in assembling the drive roll on collar 122 in the orientation shown in the latter figure, and groove 148 would be aligned with the passageway by reversing the orientation of the drive roll shown in the latter figure.

Figure 6:
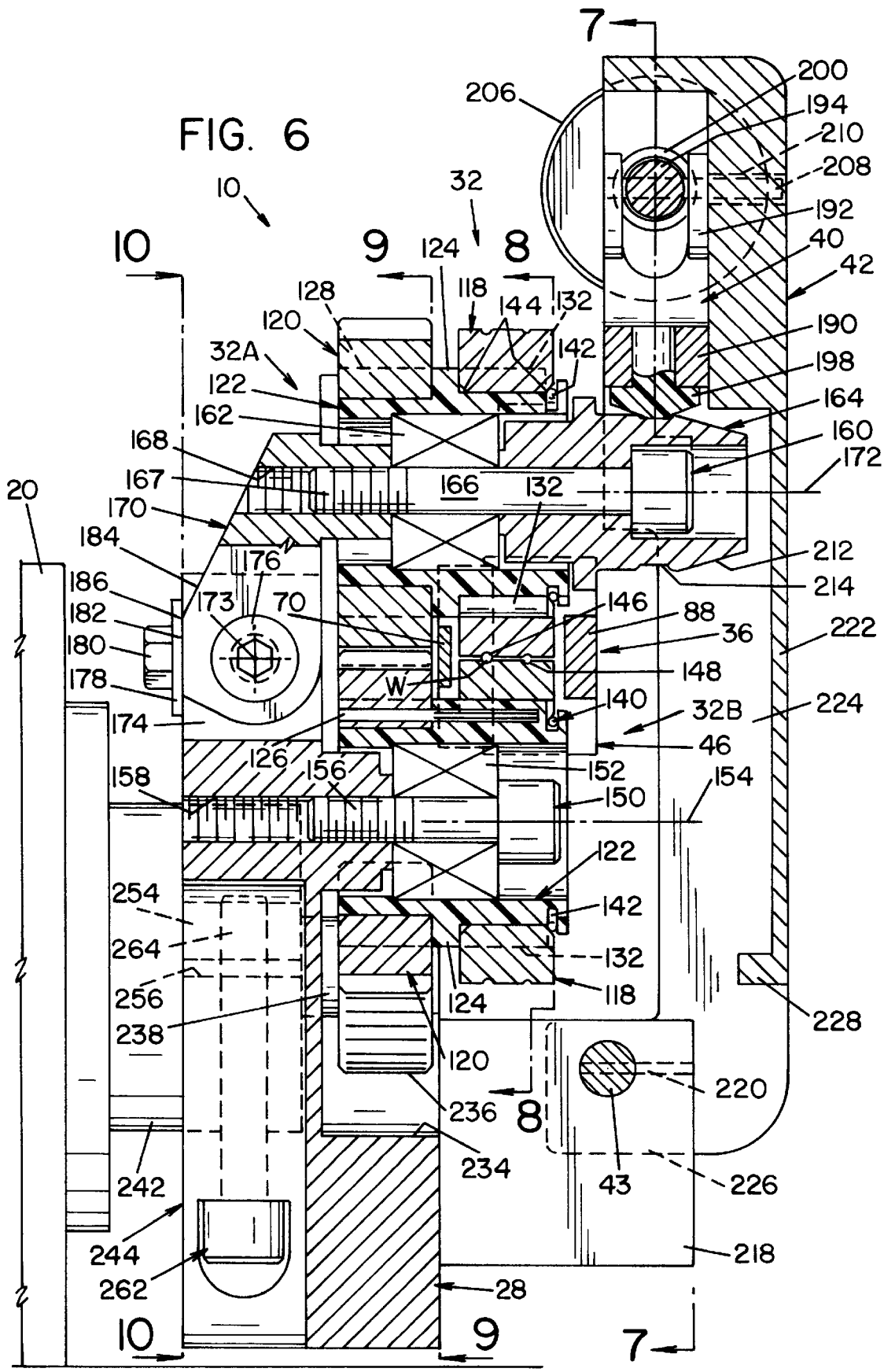
FIG. 6 is a cross-sectional elevation view of wire feeding apparatus according to the present invention taken along line 6—6 in FIG. 1 and as seen in the direction of line 6—16 in FIG. 7.

Each of the upper and lower drive roll and drive gear assemblies 32A and 32B as thus far described is adapted to be rotatably mounted on support block 28 by a corresponding support shaft arrangement. As best seen in FIG. 6, the support shaft arrangement for lower drive roll and drive gear assembly 32B is provided by a shaft member 150 and a bearing unit 152 thereon which rotatably supports a corresponding collar 122, drive roll 118 and drive gear 120 for rotation about shaft axis 154. More particularly in this respect, shaft 150 is in the form of a headed bolt having a threaded shank 156 received in an internally threaded bore 158 in the support block 28 whereby it will be appreciated that the lower drive roll and drive gear assembly is removably mounted as a unit on the support block. As best seen in FIGS. 6 and 13, the support shaft arrangement for upper drive roll and drive gear assembly 32A comprises a shaft member 160 and a bearing unit 162 thereon which rotatably supports a corresponding collar 122, drive roll 118 and drive gear 120. Shaft member 160 is in the form of a headed bolt, and a force transmitting member 164 is mounted on shank 166 between bearing unit 162 and the headed end thereof. Shank 162 has a threaded inner end 167 received in a threaded bore 168 provided therefor in a support arm 170 by which upper drive roll and drive gear assembly 32A is mounted on support block 28 as set forth more fully hereinafter. Force transmitting member 164 is on the unsupported outer end of shaft 160 for the purpose set forth hereinafter, and it will be appreciated that the shaft and bearing unit 162 support the corresponding collar, drive roll and drive gear for rotation about shaft axis 172.

Figure 10:
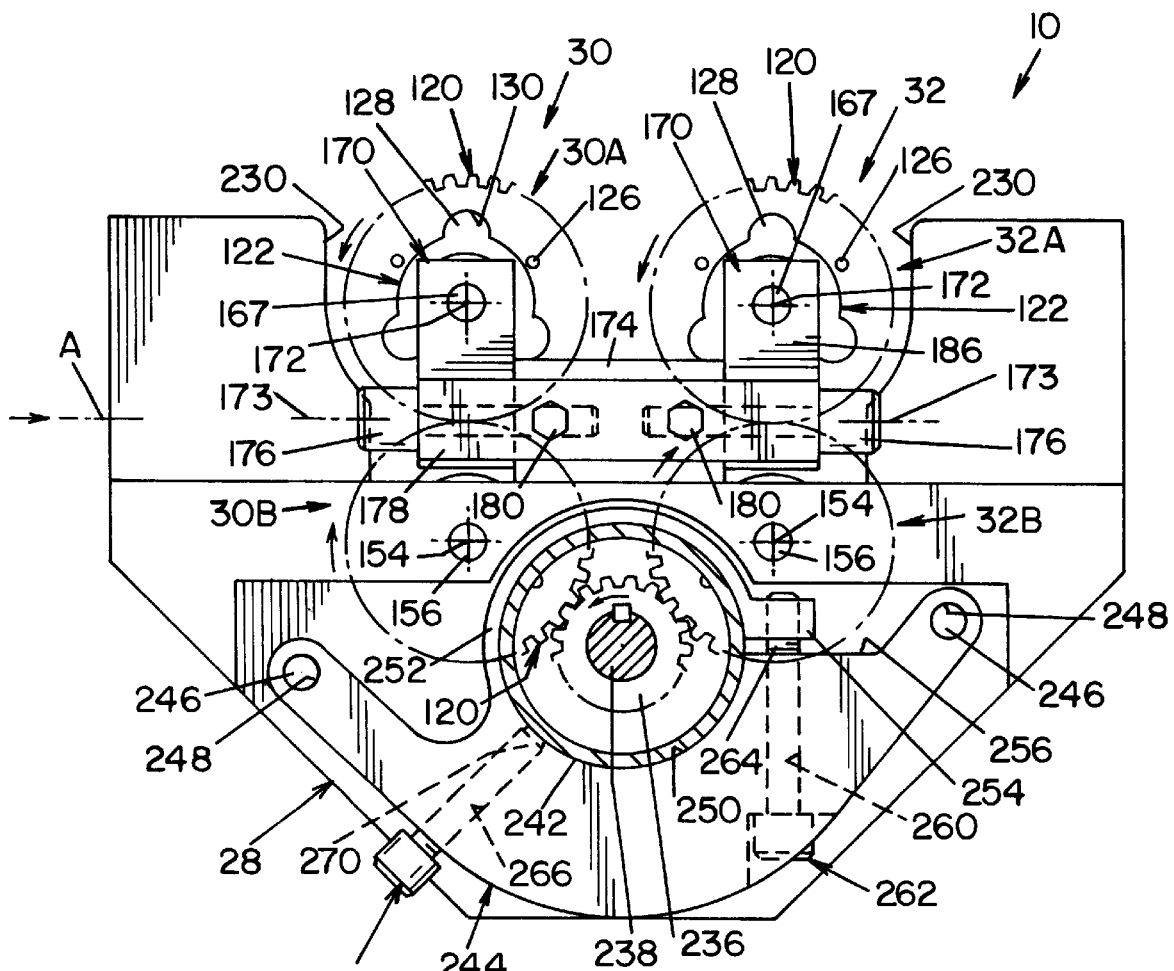
FIG. 10 is a rear elevation view, partially in section, looking in the direction of line 10—10 in FIG. 6.
Figure 11:
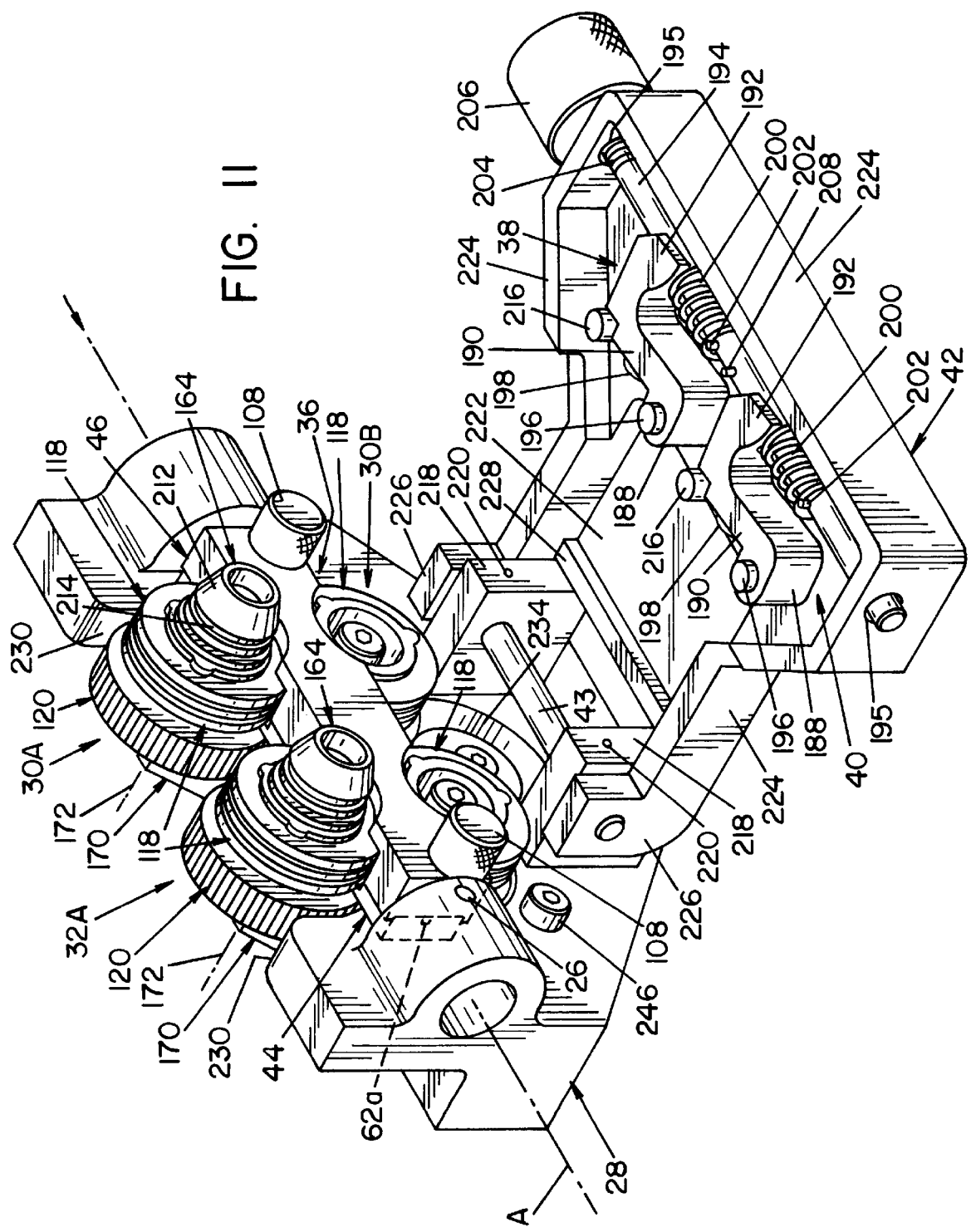
FIG. 11 is a perspective view of the apparatus showing the pivotal arm supporting the components of the force transmitting arrangement in the inoperative position.
Figure 12:
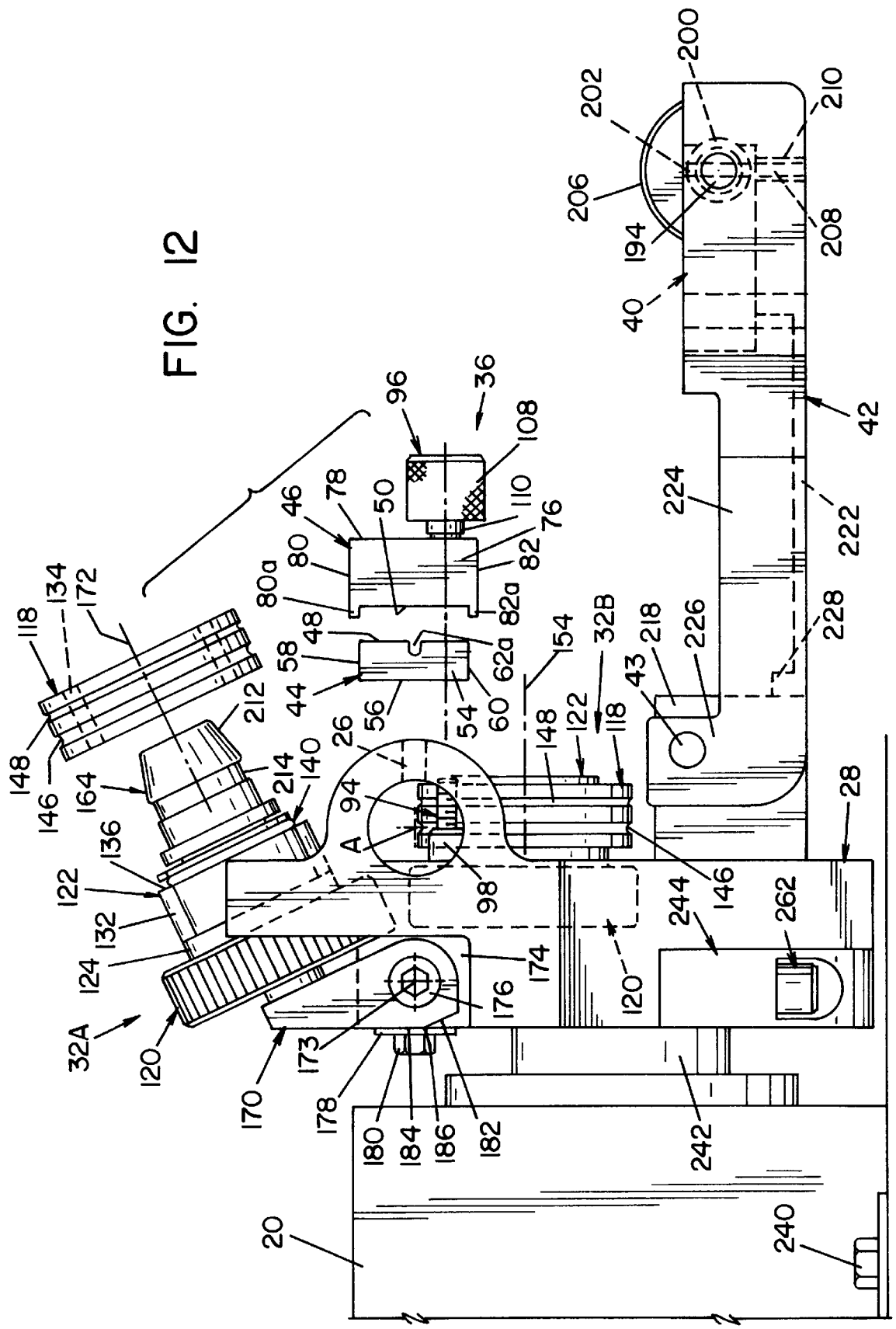
FIG. 12 is an end elevation view of the apparatus with the pivotal arm position as shown in FIG. 11 and showing one of the drive rolls and the guide plate assembly in the removed positions thereof.

As best seen in FIGS. 6, 10 and 12 of the drawing, arm 170 supports upper drive roll and drive gear assembly 32A for pivotal displacement about a pivot axis 175 parallel to axis A. Pivotal movement of assembly 32A is between an operative position relative to lower drive roll and drive gear assembly 32B as shown in FIG. 6 and in which axes 154 and 172 are parallel and an inoperative position as shown in FIG. 12 in which axis 172 is inclined upwardly relative to axis 154. More particularly in this respect, support block 28 includes a block portion 174 on the inner end thereof extending upwardly between drive roll and drive gear units 30 and 32, and the lower ends of support arms 170 for each of the upper drive roll and drive gear assemblies 30A and 32A are mounted on axially opposite ends of block portion 174 by corresponding bolts 176 which provide pivot axes 173. A leaf spring member 178 is mounted on the rear side of block portion 174 by a pair of bolts 180 for the axially opposite ends of the spring to overlie the lower rear sides of support arms 170. The latter sides of support arms 170 are provided with angularly related surfaces 182 and 184 having a line of juncture 186 therebetween and which surfaces and line of juncture provide an overcenter action with the corresponding end of spring 178 to hold arm 170 in each of the two positions thereof As will be appreciated from FIGS. 11 and 12 of the drawing, movement of upper drive roll and drive gear assemblies 30A and 32A to the inoperative positions thereof displaces the corresponding upper drive roll from the opening therefor in guide plate assembly 36.

Figure 7:
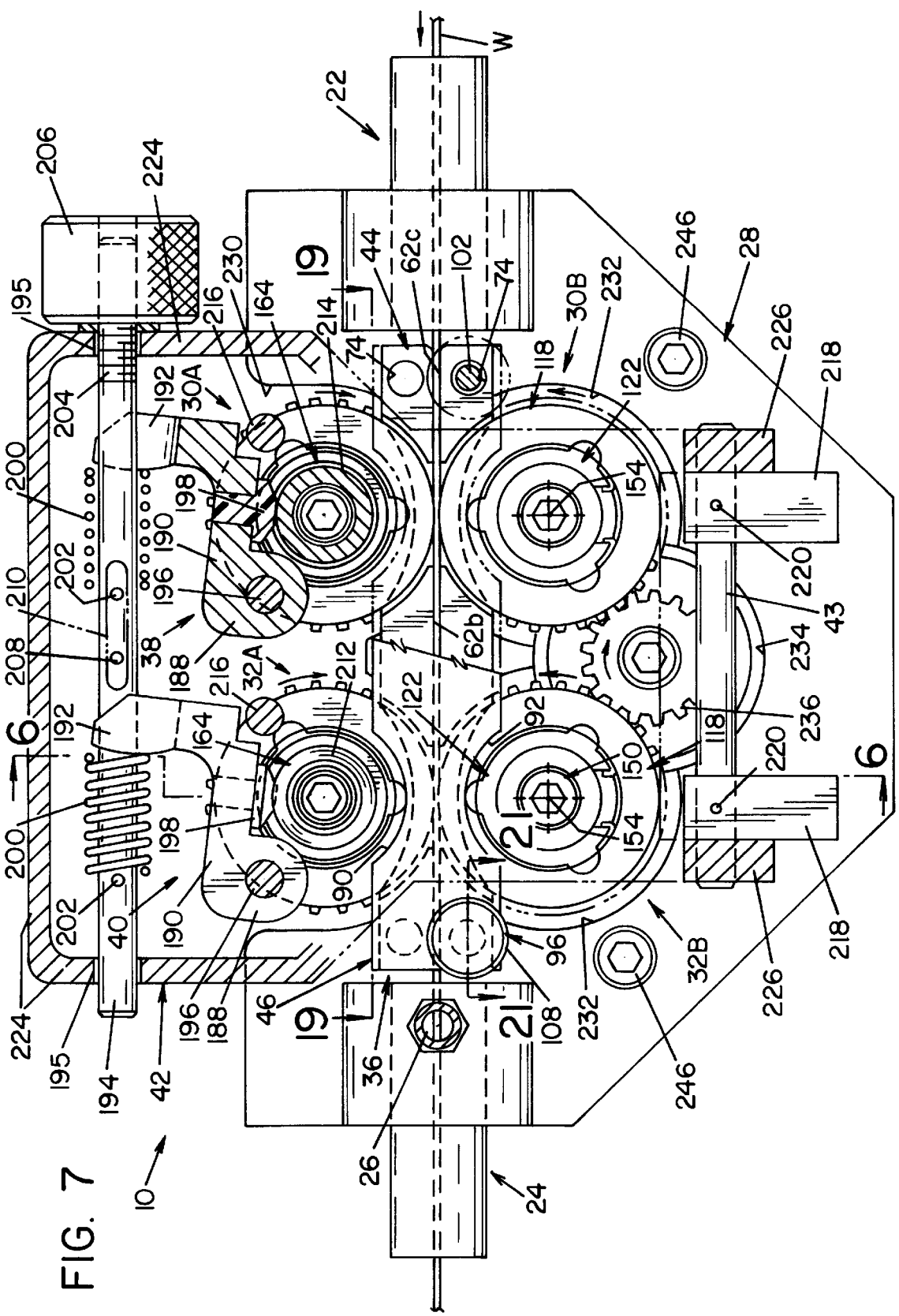
FIG. 7 is a sectional elevation view of the apparatus taken along line 7—7 in FIG. 6.
Figure 8:
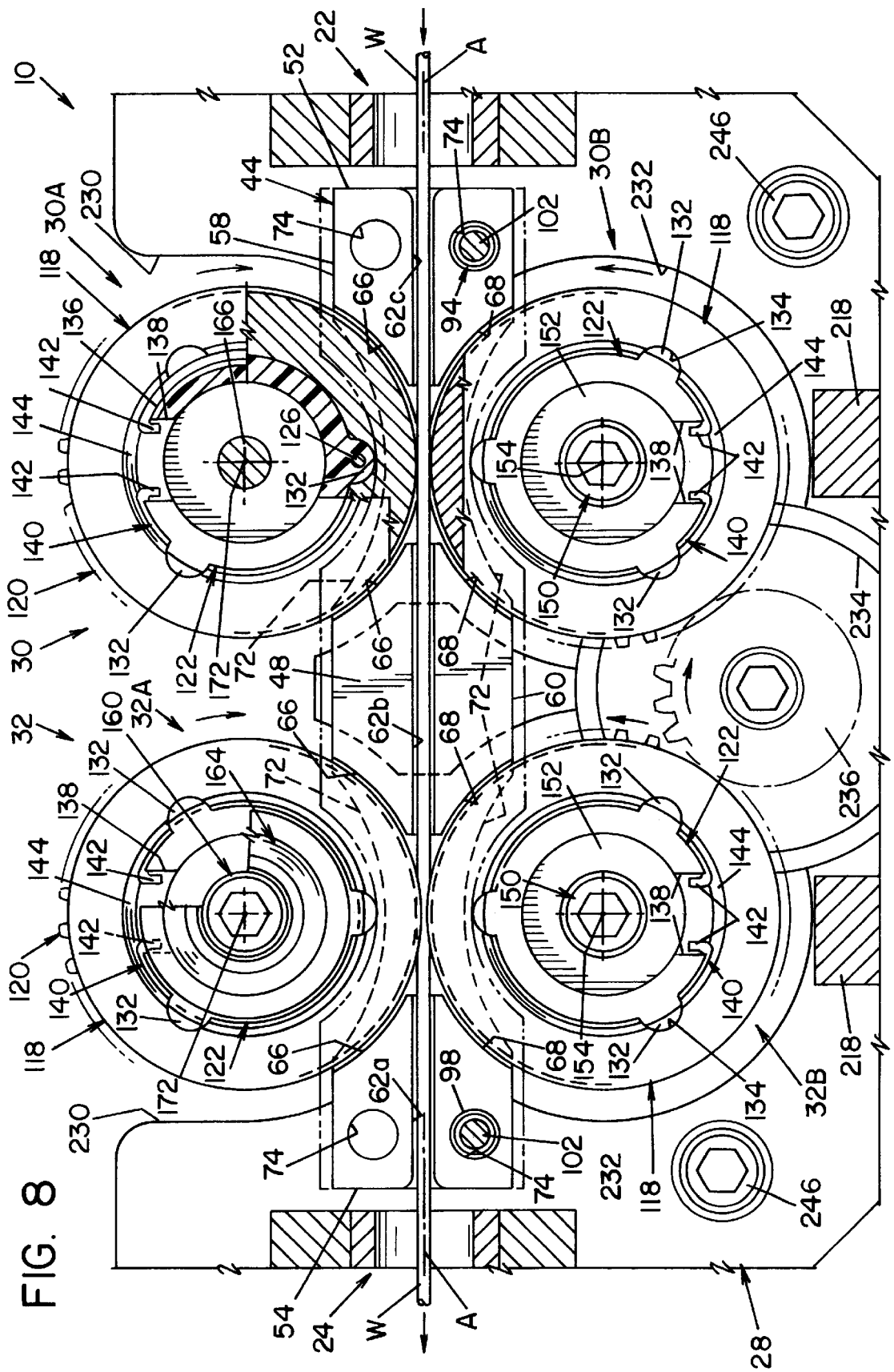
FIG. 8 is a sectional elevation view of the apparatus taken along line 8—8 in FIG. 6.

Referring now to FIGS. 6, 7, 11 and 12, the force transmitting lever arrangements 38 and 40 are mounted on pivotal arm 42 for displacement therewith between an open or inoperative position relative to upper drive roll and drive gear assemblies 30A and 32A as shown in FIGS. 11 and 12 and a closed or operative position in which the force transmitting lever arrangements interengage with force transmitting members 164 on the unsupported outer ends of the support shafts of upper drive roll and drive gear assemblies 30A and 32A as shown in FIGS. 6 and 7 of the drawing. Arm 42, the structure of which will be described in detail hereinafter, is supported on support block 28 for such pivotal displacement by a pivot pin 43 which is parallel to axis A. With respect to the orientation of the component parts shown in FIG. 7, each of the force transmitting arrangements 38 and 40 includes a generally Z-shaped lever having a leg 188 extending downwardly from one end of a generally horizontally extending central portion 190, and an upwardly extending leg 192 at the opposite end of central portion 190 which is bifurcated to receive an adjusting rod 194 therebetween. Each lever is pivotally mounted on arm 42 by means of a pin 196 extending through leg 188 and which provides a lever pivot axis, and the portion 190 of each lever is provided with a force transmitting pad insert 198 of suitable material such as nylon and which is replaceably mounted in an opening therefor in central portion 190 of the lever, not designated numerically.

When arm 42 positions the force transmitting lever arrangements in the operative positions thereof shown in FIGS. 6 and 7, pads 198 engage against the corresponding one of the force transmitting members 164 on the unsupported outer ends of support shafts 160. The pads are biased downwardly against members 164 by corresponding biasing springs 200 supported on adjusting rod 194. More particularly in this respect, each of the springs 200 is captured on rod 194 between the corresponding bifurcated lever arm 192 and a stop pin 202 on rod 194 whereby, as will be appreciated from FIG. 7, each of the levers is biased clockwise about the axis of the corresponding lever pin 196 to bias the corresponding pad 198 downwardly against the corresponding force transmitting member 164. The force of biasing springs 200 is adjustable, and in this respect, the opposite ends of adjusting rod 194 extend through openings 195 therefor in arm 42 and are supported in the openings for axial displacement relative to the arm. One end of rod 194 is provided with threads 204 which receive an internally threaded, knurled knob 206 which, when rotated relative to arm 42, axially displaces rod 194 relative to the arm. Further in this respect, rod 194 is provided with a pin 208 extending outwardly through a slot 210 in arm 42 so as to prevent rotation of rod 194 in response to rotation of knob 206 relative thereto. As will be further appreciated from FIG. 7, rotation of knob 206 in the direction to displace stop pins 202 to the right compresses biasing springs 200 against legs 192 of the levers and thus increases the force of the levers applied to force transmitting members 164 through pads 198. Accordingly, rotation of knob 206 in the opposite direction decreases the lever force.

As best seen in FIGS. 6 and 13, the axially outer end of force transmitting member 164 is provided with a tapered surface 212 and a peripheral recess 214 inwardly adjacent thereto which receives the outer end of pressure pad 198 when the force transmitting levers are in the operative positions thereof As will be appreciated from FIGS. 6, 7 and 11, displacement of arm 42 from the open or inoperative position shown in FIG. 11 to the closed or operative position shown in FIGS. 6 and 7 causes pressure pads 198 to initially engage against tapered surface 212 which cams the levers upwardly against the bias of the corresponding spring 200. When the pad drops into recess 214 it interengages therewith to releasably hold arm 42 in the operative positions of the force transmitting levers. Clockwise rotation of the levers from the positions thereof shown in FIG. 7 in response to displacement of arm 42 from the operative towards the inoperative position is limited by stop pins 216 on arm 42, whereby the levers and force transmitting pads 198 are positioned for the latter to engage tapered surfaces 212 in the manner described above.

With further regard to the structure and mounting of arm 42 on support block 28, as best seen in FIGS. 6, 7, 11 and 12, support block 28 is provided with a pair of mounting plates 218 which, with respect to lower drive roll and drive gear assemblies 30B and 32B, are laterally spaced apart and extend axially outwardly therebeneath. Mounting plates 218 are apertured to receive the opposite ends of pivot pin 43 which is staked thereto by pins 220. In the orientation of arm 42 shown in FIGS. 6 and 7, the arm has a vertically extending cover plate portion 222 bounded on the top and opposite sides thereof by wall components 224 which extend inwardly from plate portion 222. Openings 195 for adjusting rod 194 are in the upper ends of the side walls 224, and the lower ends of side walls 224 terminate in inwardly extending legs 226. Legs 226 are apertured to receive the outer ends of pivot pin 43 and accordingly support arm 42 for pivotal displacement between the closed or operative position shown in FIG. 6 and the open or inoperative position shown in FIG. 11. The lower end of plate portion 222 of the arm terminates in an inwardly extending stop wall 228 which, in the open position shown in FIG. 11, engages against the outer ends of mounting plates 218 to limit the pivotal displacement of the arm in the opening direction. As will be appreciated from FIGS. 6 and 7, the configuration and mounting of the arm 42 advantageously provides for axial compactness with respect to the axes of the drive roll and drive gear assemblies while substantially covering and thus protecting the latter assemblies and the force transmitting lever assemblies.

Figure 9:
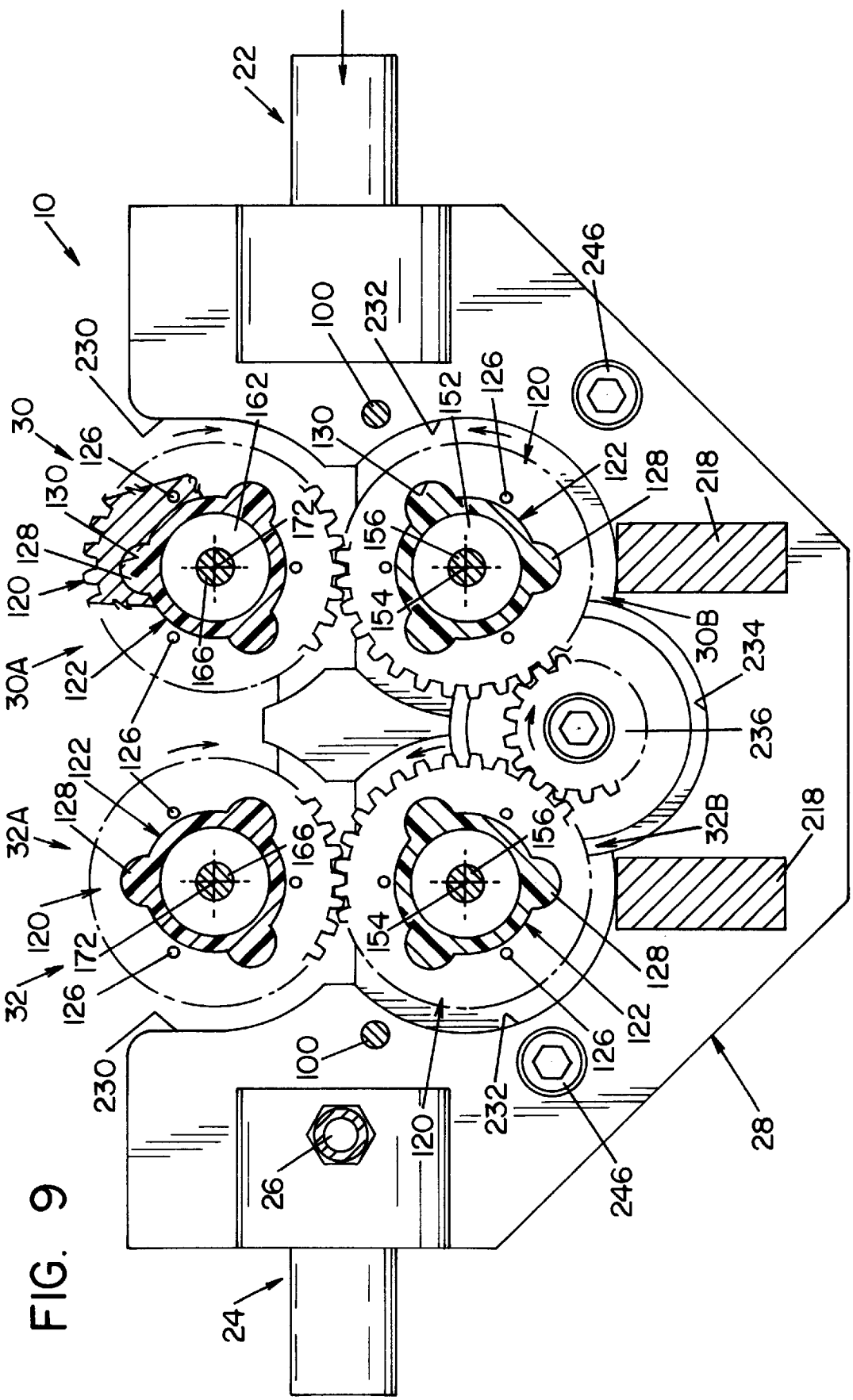
FIG. 9 is a sectional elevation view of the apparatus taken along line 9—9 in FIG. 6.

As best seen in FIGS. 6 and 9–11 of the drawings, the upper end of support block member 28 is provided with downwardly extending recesses 230 to accommodate the drive gears 120 of upper drive roll and drive gear assemblies 30A and 32A and is provided beneath recesses 230 with recesses 232 which accommodate the drive gears 120 of lower drive roll and drive gear assemblies 30B and 32B. Lower recesses 232 communicate with a recess 234 beneath and centrally therebetween and which accommodates a pinion gear 236 by which the drive gears and thus the corresponding wire driving rolls are rotated. More particularly in this respect, as best seen in FIG. 9, drive gears 120 of each of the drive roll and drive gear units 30 and 32 are vertically aligned and in meshing engagement, and the drive gears 120 of lower drive roll and drive gear assemblies 30B and 32B are in meshing engagement with pinion gear 236. Accordingly, rotation of pinion gear 236 clockwise in FIG. 9 imparts counterclockwise rotation to the lower drive gears and clockwise rotation to the upper drive gears, thus imparting the same directional rotation to the wire driving roll associated with each of the drive gears which, as will be appreciated from FIG. 7, provides for driving wire W from right to left in the latter figure.

Pinion gear 236 is mounted on a drive shaft 238 for rotation therewith, and drive shaft 238 is driven by motor 20 on which support block member 28 is mounted. More particularly in this respect, as best seen in FIGS. 6, 9, 10 and 12 of the drawings, motor 20 is suitably secured on a motor support component such as by bolts 240 and the motor housing includes a sleeve 242 on the output end thereof and through which pinion drive shaft 238 extends. Support block 28 is mounted on the motor housing through the use of a clamping collar 244 to which the support block member is securely attached by bolts 246 having headed ends engaging the outer side of the support block and threaded shanks interengaged with threaded openings 248 provided therefor in collar 244. Collar 244 is a metal plate member having a circular opening 250 therethrough by which the collar is slidably received on motor housing sleeve 242, and opening 250 is defined in part by a circular clamping strap 252 integral at one end thereof with collar 244 and terminating at its opposite end in an outwardly extending clamping arm 254 spaced from the underlying surface 256 of the collar. An opening 260 is provided in collar 244, and a clamping bolt 262 extends upwardly through opening 260 and has a threaded upper end 264 to engage with a threaded opening therefor in clamping arm 254 for constricting clamping strap 252 about motor housing sleeve 242 to clampingly mount support block member 28 on the motor housing sleeve. Collar 244 is further provided with a threaded bore 266 extending radially inwardly toward motor housing sleeve 242, and bore 266 receives the threaded shank of a bolt 268 having an inner end 270 radially engaging against the outer side of motor housing sleeve 242 to assure against rotation of collar 244 relative thereto.

Figure 18:
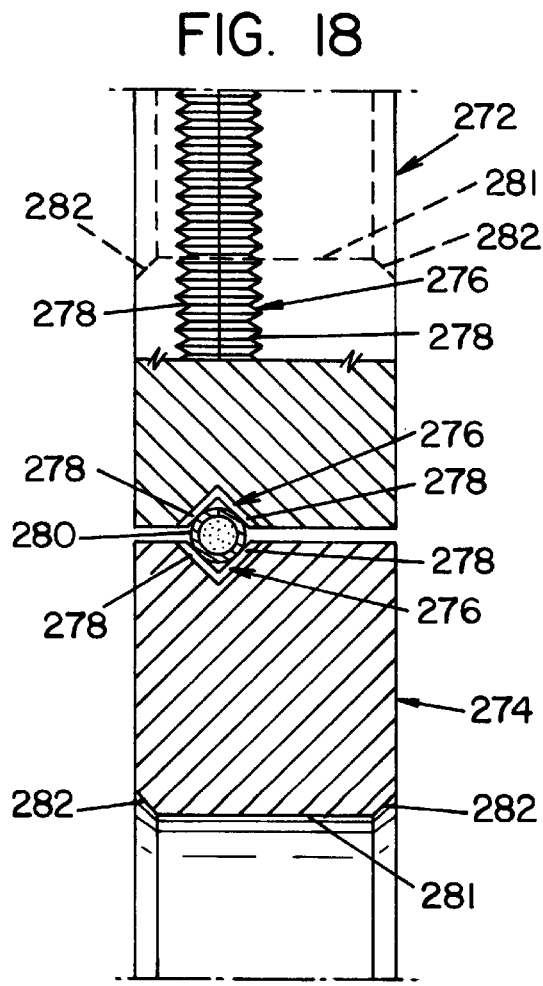
FIG. 18 is an elevation view, partially in section, showing drive rolls having opposed serrated grooves for driving cored welding electrode.
Figure 16:
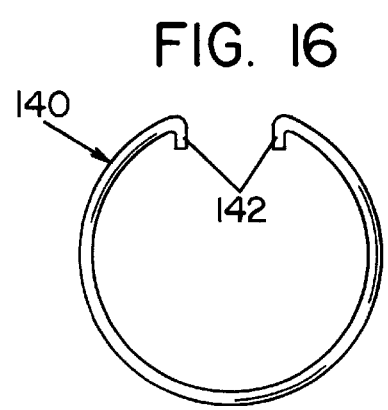
FIG. 16 illustrates the split snap ring by which the drive rolls are removably mounted on the support collar.
Figure 17:
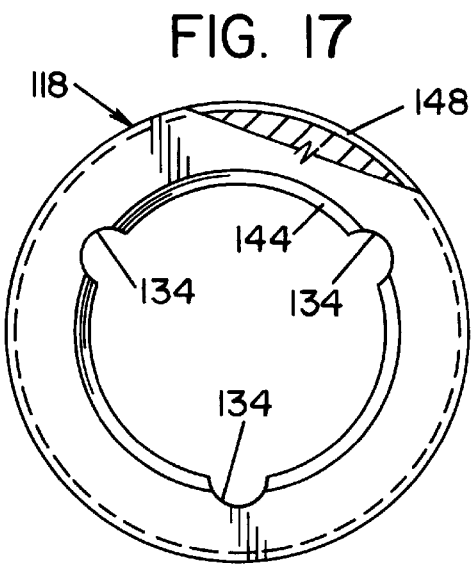
FIG. 17 is an end elevation view, partially in section, of a drive roll.

The wire driving rolls described hereinabove have circumferentially extending wire receiving grooves which are arcuate and smooth in cross-section and these groove characteristics are suitable in connection with the driving of solid welding wire in that the necessary driving engagement of the rolls with the wire to avoid slippage between the wire and rolls can be adjusted as necessary through use of the force transmitting lever arrangements. Advantageously, the latter also enables use of the invention in connection with wire driving rolls adapted to drive cored welding wire which, as is well known, comprises a flux enclosed in a soft iron sheath which is easily distorted in response to the application of a driving force against diametrically opposite sides thereof More particularly in this respect, with reference to FIG. 18 of the drawing, a pair of diametrically opposed wire driving rolls 272 and 274 are each provided with a peripherally extending V-shaped wire receiving groove 276 which is serrated along its length to provide teeth 278 which, for each groove, are at right angles to one another. Accordingly, the grooves provide two pairs of diametrically opposed teeth adapted to drivingly engage the outer surface of the soft iron sheath of a cored welding wire 280 therebetween and the teeth enable driving of the cored wire by the drive wheels with minimal driving roll force against the sheath. The adjustment capability with respect to the force applying lever arrangements described hereinabove advantageously enable the roll force to be accurately adjusted so as to provide the necessary driving contact with welding wire 280 without distorting the circular contour thereof As will be further appreciated from FIG. 18, drive rolls 272 and 274 have openings 281 therethrough by which the rolls are removably mountable on support collar 122 of the drive roll units and the axially opposite ends of openings 281 are provided with chamfers 282 for engagement with snap ring 140 in connection with removably mounting the drive rolls on support collars 122 as described hereinabove.

FIGS. 25 and 26 of the drawing illustrate a modification of wire guide plate assembly 36 which provides for the discharge of wire residue and other contaminant material from the wire guiding passageway during use of the wire feeding apparatus. In this respect, as shown in FIG. 25, wire guide slot portions 62a, 62b and 62c are provided with discharge passages 284, 286 and 288, respectively, each of which opens into and extends downwardly from the corresponding guide slot portion and communicates the latter with atmosphere through bottom side 60 of the guide plate. As will be apparent from FIG. 26, each of the discharge passages extends through flange 82a of guide plate member 46 which underlies bottom side 60 of guide plate member 44. The discharge passages advantageously provide a discharge path for residue during use of the wire feeding apparatus to retard the build up of such residue in the wire guiding passageway and thus increase the length of the periods of use of the guide plate assembly between maintenance operations for cleaning the guide slot in guide plate member 44. FIG. 27 illustrates a modification of guide plate member 44 with regard to discharge passageway 286 and, in this respect, shows the discharge passageway 286 inclined so as to exit through bottom side 60 generally centrally between outer side 56 and inner surface 48 thereof. This configuration, which of course is applicable to discharge passages 284 and 288, precludes having to extend the discharge passage through flange 82a of guide plate member 46. Further, it will be understood that the number and locations of the discharge passages illustrated in FIGS. 25 and 27 are merely illustrative of a possible number, location and orientation of discharge passages relative to the guide slots. Moreover, it will likewise be understood that discharge passages can be provided between wire guide slots 62a, 62b and 62c and top side 58 of guide plate member 44 such that the advantage of the discharge passages is available regardless of the orientation of guide plate member 44 when mounted on the wire feeding apparatus.

With further regard to wire guide plate assembly 36 as described hereinabove in accordance with the present invention, the provision of guide plate member 44 with wire guide slots covered by the planar inner surface of guide plate member 46 to cooperatively provide a wire guide passageway through the wire feeding apparatus advantageously enables the wire guiding passageway to be customized as opposed to having to be circular in cross-section as required in accordance with prior art wire guiding components. Thus, as shown for example in FIG. 28, guide plate member 44 can be provided with a U-shaped guide recess 290, and the arcuate bridging portion of the U can be provided with a plurality of axially extending passages 292 coextensive in length with guide slot 290. Passages 292 advantageously provide discharge passages for residue and/or channels in which residue can build up without interfering with movement of wire W through the guide passageway. Further customized guide passageways are illustrated in FIGS. 29 and 30 in which the guide slots in guide plate member 44 respectively designated by the numerals 294 and 296 are cooperable with inner surface 50 of guide plate member 46 to respectively provide square and triangular wire guide passageways through the guide plate assembly. As will be appreciated from FIG. 28, one or more of the walls of the guide slot provided in guide plate member 44 in FIGS. 29 and 30 can be provided with axially extending passages corresponding to passages 292 in FIG. 28.

Figure 31:
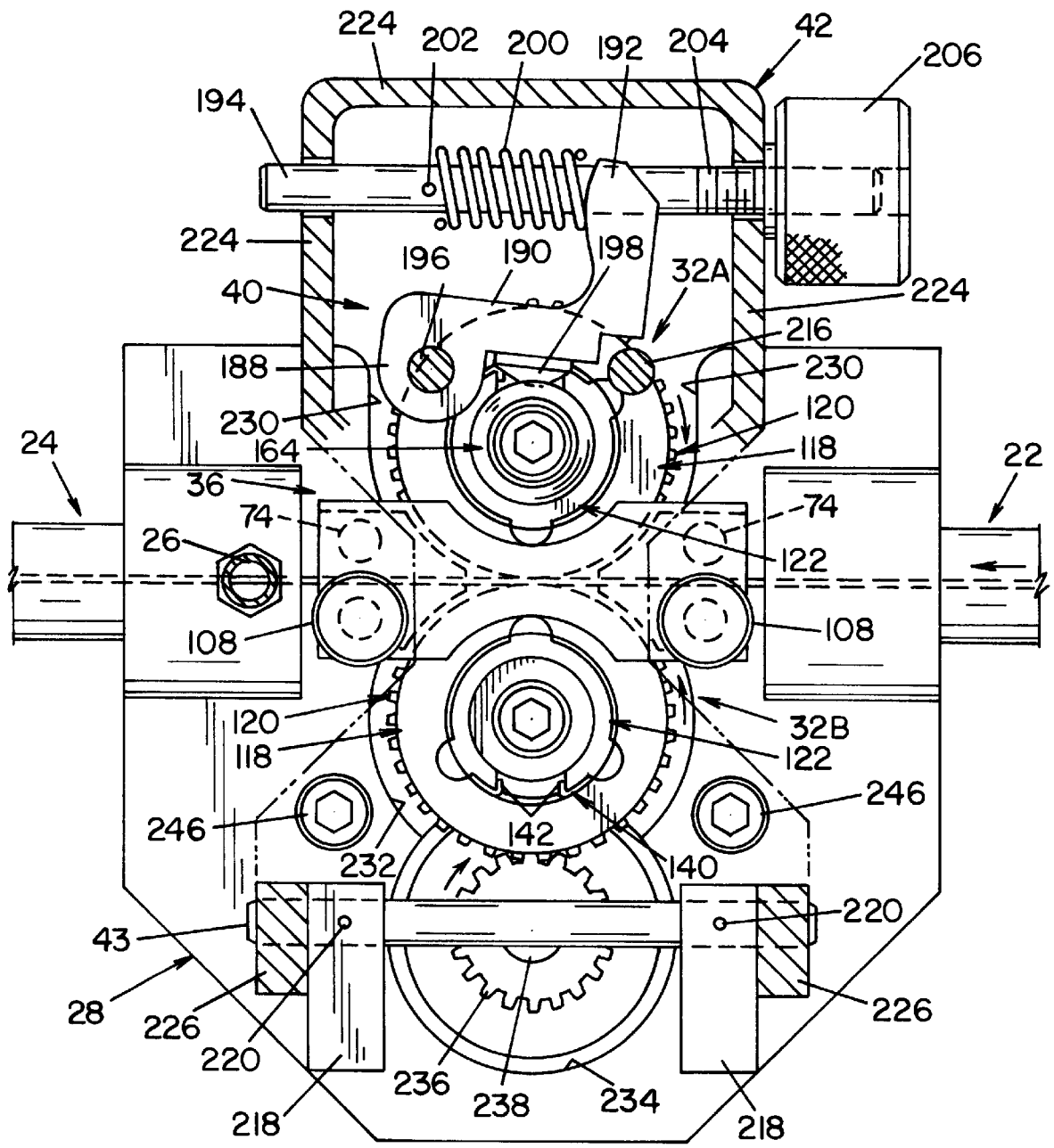
FIG. 31 is a front elevation view, partially in section, illustrating wire feeding apparatus in accordance with the present invention comprising a single pair of drive rolls.

In the embodiments of the invention described hereinabove, the wire feeding apparatus comprises first and second diametrically opposed wire drive rolls and a guide plate assembly having drive roll openings for each pair of drive rolls, and a pivotal arm and cover plate supporting a force transmitting lever assembly for each pair of rolls. However, as will be appreciated from FIG. 31, these and the other features of the present invention are applicable to wire feeding apparatus wherein a single pair of drive rolls are employed to guide and drive wire through the apparatus. Such a single roll pair arrangement is illustrated in FIG. 31 with respect to second drive roll and drive gear unit 32 and the corresponding force transmitting lever arrangement 40 therefor illustrated generally in FIG. 1 and in greater detail in FIGS. 6–13. With the exception of guide plate assembly 36 and drive pinion 236, the component parts of the wire feeding apparatus illustrated in FIG. 31 are structurally identical to those described hereinabove in connection with the latter group of figures and, accordingly, are identified in FIG. 31 by like numerals. The only structural difference with regard to guide plate assembly 36 is the shortening thereof in the direction between the longitudinally opposite ends to accommodate the use of one instead of two pairs of wire drive rolls. The wire guide plate assembly is mounted on support block member 28 in the same manner as that described herein in connection with FIGS. 21–24 of the drawing, and the modification to shorten the length of the guide plate assembly for use with a single pair of wire drive rolls will be obvious from the latter figures. The structural modification regarding drive pinion 236 is the positioning of the drive pinion diametrically below lower drive gear 120. While substantially identical in structure to the corresponding components described hereinabove, the widths of support block member 28 and pivotal arm and cover member 42 are dimensionally downsized to conform with the smaller dimensions required with respect to the component parts of the single drive roll pair arrangement.

While considerable emphasis has been placed herein on the structures and structural interrelationships between the component parts of preferred embodiments of the present invention, it will be appreciated that other embodiments of the invention can be devised and that many changes can be made in the preferred embodiments without departing from the principles of the present invention. According, it is to be distinctly understood that the foregoing descriptive matter is to be interpreted merely as illustrative of the present invention and not as a limitation.

Having thus described the invention, it is claimed:

1. In a wire feeding mechanism for moving a wire in a given direction along a path and comprising a support, drive roll means on said support for drivingly engaging said wire, means for rotating said drive roll means to move said wire in said direction, and guide means on said support for guiding movement of said wire along said path, the improvement comprising: said guide means comprising first and second guide plate members, said plate members having opposed facially engaging inner surfaces including passageway means therebetween for receiving said wire and guiding movement thereof in said direction, and means for removably mounting said guide plate members on said support.

2. The improvement according to claim 1, wherein said first and second guide plate members respectively have first and second planer inner surfaces, said passageway means including at least one slot in one of said first and second planer inner surfaces covered by the other of said first and second inner surfaces.

3. The improvement according to claim 2, wherein said slot is U-shaped transverse to said direction.

4. The improvement according to claim 2, wherein said slot is V-shaped transverse to said direction.

5. The improvement according to claim 2, wherein said slot is rectangular transverse to said direction.

6. The improvement according to claim 1, and at least one discharge passage opening into said passageway means and communicating said passageway means with atmosphere.

7. The improvement according to claim 1, wherein said means for removably mounting said guide plate members comprises locating means on said support for locating said first and second guide plate members on said support, and fastening means for releasably interengaging said first and second guide plate members and said support.

8. The improvement according to claim 7, wherein said locating means includes pins on said support and apertures in said first guide place member for receiving said pins.

9. The improvement according to claim 8, wherein said pins include first and second pin members spaced apart in said direction and said apertures include first and second apertures in said first guide plate member for respectively receiving said first and second pin members.

10. The improvement according to claim 9, further including third and fourth apertures in said first guide plate member for respectively receiving said first and second pin members, said first and third apertures being on opposite sides of said passageway means and equally spaced a given distance therefrom, and said second and fourth apertures being on opposite sides of said passageway means and equally spaced said give distance therefrom.

11. The improvement according to claim 9, wherein each said first and second pin member has an axis and said fastening includes first and second threaded shanks respectively coaxial with said first and second pin members, first and second openings in said second guide plate member respectively receiving said first and second threaded shank, and first and second rotatable knobs having an internally threaded bore for respectively receiving said first and second threaded shanks, said first and second knobs engaging said second guide plate member to clampingly engage said first and second guide plate members against said support means.

12. The improvement according to claim 11, wherein said first and second knobs are rotatably supported in said first and second opening in said second guide plate member, and retainer means on said second guide plate member for preventing separation of each said first and second knob from said second guide plate member.

13. The improvement according to claim 11, further including third and fourth apertures in said first guide plate member for respectively receiving said first and second pin members, said first and third apertures being on opposite sides of said passageway means and equally spaced a given distance therefrom, and said second and fourth apertures being on opposite sides of said passageway means and equally spaced said give distance therefrom.

14. The improvement according to claim 13, wherein said first and second knobs are rotatably supported in said first and second openings in said second guide plate member, and retainer means on said second guide plate member for preventing separation of each said first and second knob from said second guide plate member.

15. The improvement according to claim 11, wherein said first and second guide plate members respectively have first and second planer inner surfaces, said passageway means including at least one slot in one of said first and second planer inner surfaces covered by the other of said first and second inner surfaces.

16. The improvement according to claim 15, wherein said slot is in said first inner surface.

17. The improvement according to claim 1, wherein said first and second guide plate members have opposite ends in said direction, top and bottom sides and laterally outer sides, said passageway means extending between said opposite ends, and a drive roll opening extending through said top and bottom sides between said opposite ends and intersecting said passageway means, said drive roll opening receiving said drive roll means for said drive roll means to engage said wire therebetween.

18. The improvement according to claim 17, wherein said drive roll opening is a first drive roll opening and said drive roll means is first drive roll means, a second drive roll opening spaced from said first drive roll opening and extending through said top and bottom sides and intersecting said passageway means, and second drive roll means, said second drive roll opening receiving said second drive roll means for said second drive roll means to engage said wire therebetween.

19. The improvement according to claim 18, wherein each said first and second drive roll opening includes opening ends spaced apart in said direction and intersecting said passageway means, upper walls diverging from said opening ends of each of said first and second drive roll openings and intersecting said top sides, and lower walls diverging from said opening ends of each of said first and second drive roll openings and intersecting said bottom sides.

20. The improvement according to claim 19, wherein said upper and lower walls are arcuate.

21. The improvement according to claim 17, wherein said drive roll opening includes opening ends spaced apart in said direction and intersecting said passageway means, upper walls diverging from said opening ends and intersecting said top sides, and lower walls diverging from said opening ends and intersecting said bottom sides.

22. The improvement according to claim 21, wherein said upper and lower walls are arcuate.

23. The improvement according to claim 17, wherein said inner surfaces are first and second planar inner surfaces respectively on said first and second guide plate members, said passageway means comprising a slot in said first planar inner surface and said second planar inner surface covering said slot.

24. The improvement according to claim 23, wherein said slot is centrally between said top and bottom sides.

25. The improvement according to claim 24, wherein said means for mounting said guide plate members includes guide plate locating apertures extending through said first guide plate member between the outer side and inner surface thereof, said locating apertures having axes and being adjacent the opposite ends of said first guide plate member.

26. The improvement according to claim 25, wherein said means for mounting said guide plate members further includes a fastener element mounted on each of the opposite ends of said second guide plate member for rotation relative thereto about a corresponding fastener axis, said fastener elements being mounted on said second guide plate member for axial alignment with said locating apertures through said opposite ends of said first guide plate member.

27. The improvement according to claim 25, wherein said locating apertures include pairs of locating apertures at each of said opposite ends of said first guide plate member, the apertures of each said pair being on opposite sides of said slot and equally spaced therefrom.

28. The improvement according to claim 27, wherein said drive roll opening includes end walls spaced apart in said direction and in planes transversely intersecting said slot, upper walls diverging from said end walls and intersecting said top sides, and lower walls diverging from said end walls and intersecting said bottom sides.

29. The improvement according to claim 28, wherein said means for mounting said guide plate members further includes a fastener element mounted on each of the opposite ends of said second guide plate member for rotation relative thereto about a corresponding fastener axis, said fastener elements being mounted on said second guide plate member for axial alignment with a locating aperture of each of said pair of locating apertures through said opposite ends of said first guide plate member.

30. The improvement according to claim 27, wherein said drive roll opening is a first drive roll opening and said drive roll means is first drive roll means, a second drive roll opening spaced from said first drive roll opening and extending through said top and bottom sides and intersecting said slot, and second drive roll means, said second drive roll opening receiving said second drive roll means for said second drive roll means to engage said wire therebetween, said first and second drive roll openings being between said pairs of locating apertures with respect to said direction.

31. The improvement according to claim 30, wherein each said first and second drive roll opening includes end walls spaced apart in said direction and in planes transversely intersecting said slot, upper walls diverging from said end walls each of said first and second drive roll openings and intersecting said top sides, and lower walls diverging from said end walls of each of said first and second drive roll openings and intersecting said bottom sides.

32. The improvement according to claim 31, wherein said means for mounting said guide plate members further includes a fastener element mounted on each of the opposite ends of said second guide plate member for rotation relative thereto about a corresponding fastener axis, said fastener elements being mounted on said second guide plate member for axial alignment with a locating aperture of each of said pair of locating apertures through said opposite ends of said first guide plate member.

33. The improvement according to claim 32, wherein said upper and lower walls are arcuate.

34. The improvement according to claim 27, wherein said means for mounting said guide plate members further includes a fastener element mounted on each of the opposite ends of said second guide plate member for rotation relative thereto about a corresponding fastener axis, said fastener elements being mounted on said second guide plate member for axial alignment with a locating aperture of each of said pair of locating apertures through said opposite ends of said first guide plate member.

35. A guide plate assembly for guiding movement of wire in a wire feeding mechanism including wire drive rolls, comprising first and second guide plate members having longitudinally opposite ends, laterally outer sides, top and bottom sides and opposed facially engaging planar inner surfaces, a slot in the inner surface of said first guide plate member between the opposite ends thereof for receiving wire to be guided, the planar inner surface of said second guide plate member covering said slot, and opposed recesses in said opposed planar inner surfaces of said first and second guide plate members, said opposed recesses providing drive roll openings through said top and bottom sides, said drive roll openings having longitudinally spaced inner ends intersecting said slot.

36. A guide plate assembly according to claim 35, wherein said opposed recesses include first and second pairs of opposed recesses providing first and second longitudinally spaced apart drive roll openings through said top and bottom sides.

37. A guide plate assembly according to claim 35, wherein said inner ends of said drive roll openings include end walls in planes transverse to said slot, and said openings further include diverging walls extending from said end walls and intersecting said top and bottom sides of said guide plate members.

38. A guide plate assembly according to claim 35, wherein said top and bottom sides of said second guide plate member include laterally extending flanges respectively overlying said top and bottom sides of said first guide plate member adjacent the planar inner surface thereof.

39. A guide plate assembly according to claim 35, and at least one discharge passage communicating said slot with atmosphere.

40. A guide plate assembly according to claim 35, wherein said first guide plate member includes at least one mounting aperture at each of the opposite ends thereof extending therethrough between the inner surface and outer side thereof.

41. A guide plate assembly according to claim 40, including a pair of said mounting apertures at each of said opposite ends, the apertures of each pair being on opposite sides of said slot and equally spaced therefrom.

42. A guide plate assembly according to claim 35, wherein said second guide plate member includes a fastener member mounted on each of said opposite ends for rotation about an axis extending between the outer side and inner surface of said second guide plate member, said fastener member having an outer end adjacent said outer side of said second guide plate member for manually rotating said fastener member.

43. A guide plate assembly according to claim 42, and retaining means for precluding axial separation of said fastener from said second guide plate member.

44. A guide plate assembly according to claim 42, wherein each said fastener has an inner end in a bore therefor extending through said second guide plate member between said outer side and inner surface thereof, said inner end of said fastener having a threaded opening therein extending axially toward said outer end.

45. A guide plate assembly according to claim 44, wherein said fastener is axially slidable in said bore, and pin means for engaging said inner end of said fastener in said bore to preclude axial separation of said fastener from said second guide plate member.

46. A guide plate assembly according to claim 35, wherein said first guide plate member includes at least one mounting aperture at each of the opposite ends thereof extending therethrough between the inner surface and outer side thereof and having an axis, said second guide plate member including a bore at each of the opposite ends thereof coaxially alignable with the mounting opening at the corresponding end of said first guide plate member, and a rotatable fastener member having an inner end in said bore and an outer end adjacent the outer side of said second guide plate member for manually rotating said fastener member.

47. A guide plate assembly according to claim 46, wherein said top and bottom sides of said second guide plate member include laterally extending flanges respectively overlying said top and bottom sides of said first guide plate member adjacent the planar inner surface thereof.

48. A guide plate assembly according to claim 46, wherein said inner ends of said drive roll openings include end walls in planes transverse to said slot, and said openings include diverging walls extending from said end walls and intersecting said top and bottom sides of said guide plate members.

49. A guide plate assembly according to claim 48, including a pair of said mounting apertures at each of said opposite ends of said first guide plate member, the apertures of each pair being on opposite sides of said slot and equally spaced therefrom.

50. A guide plate assembly according to claim 49, wherein said opposed complimentary recesses include first and second pairs of opposed complimentary recesses providing first and second longitudinally spaced apart drive roll openings through said top and bottom sides.

51. A guide plate assembly according to claim 50, wherein said top and bottom sides of said second guide plate member include laterally extending flanges respectively overlying said top and bottom sides of said first guide plate member adjacent the planar inner surface thereof.

52. A guide plate assembly according to claim 51, wherein said fastener is axially slidable in said bore, and pin means for engaging said inner end of said fastener in said bore to preclude axial separation of said fastener from said second guide plate member.

53. In a wire feeding mechanism for moving wire in a given direction along a path and comprising a support, first and second drive roll means on said support for engaging diametrically opposite sides of said wire, and means for rotating said drive roll means to move said wire in said direction, the improvement comprising: each said first and second drive roll means including an annular collar having an axis and axially opposite ends, means for supporting said collar on said support for rotation about said axis, an annular drive roll axially slidably received on one end of said opposite ends of said collar and supported thereon for rotation therewith about said axis, means including annular retaining ring means removably mounted on said one end of said collar for axially retaining said drive roll thereon, and said means for rotating said drive roll means including a drive gear axially slidably received on the other of said opposite ends of said collar and supported thereon for rotation therewith about said axis.

54. The improvement according to claim 53, wherein said one end of said collar has an outer end and a radially outwardly extending shoulder axially spaced from said outer end, said drive roll having an inner end engaging against said shoulder and an outer end adjacent said outer end of said collar, and said retaining ring means engaging against said outer end of said drive roll.

55. The improvement according to claim 53, wherein said one end of said collar has an outer end, an annular recess axially inwardly adjacent said outer end, said recess including circumferentially spaced end walls, said retaining ring means being received in said annular recess and being radially expandable and contractible relative thereto, and said retaining ring means having radially inwardly extending opposite end portions engaging against said end walls to limit radial expansion of said retaining ring means.

56. The improvement according to claim 55, wherein said collar includes a radially outwardly extending shoulder spaced axially inwardly from said annular recess, said drive roll having an inner end engaging against said shoulder and an outer end adjacent said annular recess, and said retaining ring means engaging against said outer end of said drive roll.

57. The improvement according to claim 53, wherein said collar and said drive roll have interengaging lobe means and recess means for precluding relative rotation therebetween.

58. The improvement according to claim 57, wherein said lobe means includes a plurality of axially extending lobes circumferentially spaced apart on said one end of said collar and said recess means includes axially extending recesses in said drive roll for receiving said lobes.

59. The improvement according to claim 58, wherein said one end of said collar has an outer end, an annular recess axially inwardly adjacent said outer end, said recess including circumferentially spaced end walls, said retaining ring means being received in said annular recess and being radially expandable and contractible relative thereto, and said retaining ring means having radially inwardly extending opposite end portions engaging against said end walls to limit radial expansion of said retaining ring means.

60. The improvement according to claim 59, wherein said drive roll has axially spaced apart circumferentially extending wire engaging recesses for drivingly engaging different diameter wire, one of said recesses coinciding with said path, and said drive roll being reversible on said collar for the other of said recesses to coincide with said path.

61. The improvement according to claim 53, wherein said drive roll has axially spaced apart circumferentially extending wire engaging recesses for drivingly engaging different diameter wire, one of said recesses coinciding with said path, and said drive roll being reversible on said collar for the other of said recesses to coincide with said path.

62. The improvement according to claim 55, wherein said collar and drive roll have interengaging lobes and recesses to preclude relative rotation therebetween, and said collar and drive gear have interengaging lobes and recesses to preclude relative rotation therebetween.

63. The improvement according to claim 53, wherein said means for supporting said collar on said support includes a support shaft coaxial with said axis and having an inner end mounted on said support and an outer end spaced from said support, said collar being supported on said shaft between said inner and outer ends.

64. The improvement according to claim 63, wherein said support includes means for supporting the support shaft of one of said first and second drive roll means for pivotal displacement between first and second positions relative to the support shaft of the other, the support shafts of said one and said other of said first and second drive roll means being parallel in said first position and at an angle to one another in said second position.

65. The improvement according to claim 64, and holding means for releasably holding said means for supporting said support shaft of said one drive roll means in each of said first and second positions thereof.

66. The improvement according to claim 64, wherein said means for supporting said support shaft of said one drive roll means includes a support arm pivotal about a pivot axis transverse to the axis of said support shaft of said one drive roll means.

67. The improvement according to claim 66, wherein said pivot axis is transverse to a plane through the axes of the support shafts of said first and second drive roll means.

68. The improvement according to claim 67, and holding means for releasable holding said support arm in each of said first and second positions of said support shaft of said one drive roll means.

69. The improvement according to claim 68, wherein said holding means includes spring means.

70. The improvement according to claim 69, wherein said spring means includes a spring plate for alternately engaging against first and second surfaces on said support arm respectively corresponding to said first and second position.

71. The improvement according to claim 68, wherein said one end of the collar of said one drive roll means has an outer end transverse to the axis of said support shaft of said one drive roll means, an annular recess axially inwardly adjacent said outer end, said recess including circumferentially spaced end walls, said retaining ring means being received in said annular recess and being radially expandable and contractible relative thereto, and said retaining ring means having radially inwardly extending opposite end portions engaging against said end walls to limit radial expansion of said retaining ring means.

72. The improvement according to claim 71, wherein said collar of said one drive roll means includes a radially outwardly extending shoulder spaced axially inwardly from said annular recess, the drive roll of said one drive roll means having an inner end engaging against said shoulder and an outer end adjacent said annular recess, and said retaining ring means engaging against said outer end of said drive roll of said one drive roll means.

73. The improvement according to claim 72, wherein the drive rolls of said first and second drive roll means have axially spaced apart circumferentially extending wire engaging recesses for drivingly engaging different diameter wire, corresponding ones of said recesses on said drive rolls coinciding with said path, and said drive rolls being reversible on said collar for the other corresponding ones of said recesses to coincide with said path.

74. The improvement according to claim 73, wherein said collar and said drive roll of said one drive roll means have interengaging lobes and recesses to preclude relative rotation therebetween, and said collar of said one drive roll means and said drive gear have interengaging lobes and recesses to preclude relative rotation therebetween.

75. In a wire feeding mechanism for moving a wire in a given direction along a path and comprising a support, at least two drive rolls on said support for drivingly engaging said wire therebetween, means for rotating said drive rolls to move said wire in said direction, and means for biasing one drive roll of said drive rolls in the direction of engagement thereof with said wire, the improvement comprising: a drive roll support shaft having a shaft axis, said shaft having a first end attached to said support and a second end axially spaced from said support, said one drive roll being rotatably supported on said shaft for said second end to extend outwardly from said one drive roll, and said means for biasing said one drive roll including force applying means for applying a force directly against said second end of said shaft along a line transverse to and intersecting said axis.

76. The improvement according to claim 75, and means supporting said force applying means for displacement between engaged and disengaged positions relative to said second end of said shaft.

77. The improvement according to claim 75, wherein said force applying means includes a lever, an arm supporting said lever for pivotal displacement about a lever axis, said lever having force transmitting means spaced from said lever axis and engaging said second end.

78. The improvement according to claim 77, and means including spring means for biasing said force transmitting means against said second end.

79. The improvement according to claim 78, and means for adjusting the bias of said spring means.

80. The improvement according to claim 77, wherein said lever axis is parallel to and spaced from said shaft axis and said lever includes an end spaced from said lever axis a distance greater than that of said force transmitting means, and spring means engaging against said end for biasing said force transmitting means against said second end.

81. The improvement according to claim 80, wherein said spring means is a coil spring, an adjusting rod having an axis transverse to said lever axis, a stop on said rod, said coil spring being on said rod between said end of said lever and said stop, said adjusting rod being supported on said arm for axial displacement to axially displace said stop means toward and away from said end to adjust the bias of said coil spring against said end.

82. The improvement according to claim 81, and adjusting knob means interengaged with said adjusting rod for rotation of said knob to impart axial displacement to said adjusting rod.

83. The improvement according to claim 82, wherein said force transmitting means is an insert of polymeric material mounted on said lever and having an end engaging said second end of said shaft, and said second end of said shaft includes a recess receiving said end of said insert.

84. The improvement according to claim 81, wherein said arm is mounted on said support for pivotal displacement about an arm axis parallel to said axis of said adjusting rod, said arm being displaceable about said arm axis between a first position in which said force transmitting means engages said second end of said shaft and a second position in which said force transmitting means disengages said second end of said shaft.

85. The improvement according to claim 84, wherein said second end of said shaft includes means interengaging with said force transmitting to releasably hold said arm means in said first position.

86. The improvement according to claim 85, wherein said means interengaging with said force transmitting means includes a recess in said second end, said force transmitting means having an end received in said recess when said arm is in said first position.

87. The improvement according to claim 86, further including an adjusting knob rotatable relative to said arm, and means interengaging said knob with said adjusting rod for rotation of said knob to impart axial displacement to said adjusting rod.

88. Apparatus for feeding wire in a given direction along a path, comprising a support member, first and second drive roll and drive gear assemblies, each said assembly including a support collar having a collar axis and a drive roll and a drive gear coaxially mounted on said collar for rotation therewith, means including first and second support shafts for respectively supporting the collars of said first and second assemblies for rotation about the corresponding collar axis, said first and second support shafts being mounted on said support member for the drive rolls of said first and second assemblies to be diametrically opposed and for the drive gears of said first and second assemblies to be drivingly interengaged, guide plates having opposite ends and comprising a first guide plate member having a planar inner surface and a wire guide slot therein between said opposite ends and a second guide plate member having a planar inner surface covering said guide slot and providing a wire guiding passageway therewith, said guide plates including drive roll openings between said ends and intersecting said passageway, means for removably mounting said guide plates on said support member for said passageway to provide said path and for said diametrically opposed drive rolls to extend into said drive roll openings to engage diametrically opposite sides of wire in said passageway, means to rotate one of said drive gears of said first and second assemblies for said drive rolls to move said wire in said direction, and means for applying a biasing force against said first support shaft in a direction for biasing the drive roll of said first assembly diametrically toward the drive roll of said second assembly.

89. Apparatus according to claim 88, wherein said means for mounting said guide plates on said support member includes locating apertures through said first guide plate member at said opposite ends, first and second guide pins mounted on said support member, said apertures receiving said guide pins, said guide pins including threaded shanks extending outwardly therefrom, said second guide plate member including first and second bores respectively receiving the threaded shanks of said first and second guide pins, and fastener means on said second guide plate member for interengaging with said threaded shanks to clamp said first and second guide plate members against said support member.

90. Apparatus according to claim 89, wherein said second guide plate member has an outer side and each said fastener means is rotatable relative to said second guide plate member and includes a knob adjacent said outer side and a stem extending into the corresponding one of said first and second bores from said knob, said stem including a threaded bore for receiving the threaded shank of the corresponding one of said first and second guide pins.

91. Apparatus according to claim 90, wherein said stem is axially slidable in the corresponding one of said first and second bores, and means interengaging with said stem to retain said fastener against axial separation from said second guide plate member.

92. Apparatus according to claim 88, wherein the support collar of each of said first and second assemblies has an end and a radially outwardly extending shoulder axially spaced from said end, an annular recess axially inwardly adjacent said end, the corresponding drive roll having an inner end engaging said shoulder and an outer end adjacent said recess, and a resilient retaining ring in said recess engaging said outer end of the corresponding drive roll to removably mount said drive roll on said collar.

93. Apparatus according to claim 92, wherein said recess includes circumferentially spaced end walls, and said retaining ring is radially expandable and contractible relative to said recess and has radially inwardly extending opposite end portions engaging against said end walls to limit radial expansion of said ring.

94. Apparatus according to claim 88, wherein said means for applying a biasing force against said first support shaft includes an arm pivotal about an arm axis transverse to said collar axis between first and second positions relative to said first support shaft, a lever mounted on said arm for pivotal displacement about a lever axis which is parallel to said collar axis in said first position, said lever including an end spaced from said lever axis and a force transmitting element between said lever axis and said end, said first support shaft having an end spaced from said support member and engaged by said force transmitting element in said first position of said arm, an adjusting rod mounted on said arm and having a rod axis parallel to said arm axis, said end of said lever extending across said rod, a stop on said rod, and a biasing spring on said rod between said stop and said end of said lever for biasing said force transmitting element against said end of said first support shaft.

95. Apparatus according to claim 94, wherein said rod is axially sidably supported on said arm for displacing said stop toward and away from said end of said lever, and an adjusting knob threadedly interengaged with said rod for rotation of said knob to axially displace said rod to adjust the force of said spring against said end of said lever.

96. Apparatus according to claim 95, wherein said end of said first support shaft includes a force transmitting member having an outer end, an annular groove spaced axially inwardly of said outer end, and a tapered surface between said outer end and said groove, said force transmitting element on said lever engaging in said groove in said first position to releasable hold said arm in said first position.

97. Apparatus according to claim 88, further including a shaft supporting arm mounted on said support member for pivotal displacement about an axis transverse to said collar axis, said first support shaft having an inner end removably mounted on said shaft supporting arm for pivotal displacement therewith between a first position in which the collar axis of the first assembly is parallel to the collar axis of the second assembly and a second position in which the collar axis of the first assembly is at an angle to the collar axis of the second assembly, and spring means on said support member interengaging with said shaft supporting arm for holding the latter in each of said first and second positions thereof.

98. Apparatus according to claim 88, wherein said first and second guide plate members have top and bottom sides and said drive roll openings in said guide plates include opposed recesses in said planar inner surfaces of said first and second guide plate members, said recesses having end walls spaced apart in the direction between said opposite ends and intersecting said wire guiding passageway and diverging upper and lower walls extending from said walls and respectively intersecting said top and bottom sides, and said second guide plate member including laterally extending flanges respectively overlying said top and bottom sides of first guide plate member.

99. Apparatus according to claim 98, wherein said means for mounting said guide plates on said support member includes locating apertures through said first guide plate member at said opposite ends, first and second guide pins mounted on said support member, said apertures receiving said guide pins, said guide pins including threaded shanks extending outwardly therefrom, said second guide plate member including first and second bores respectively receiving the threaded shanks of said first and second guide pins, and fastener means on said second guide plate member for interengaging with said threaded shanks to clamp said first and second guide plate members against said support member.

100. Apparatus according to claim 99, wherein said second guide plate member has an outer side and each said fastener means is rotatable relative to said second guide plate member and includes a knob adjacent said outer side and a stem extending into the corresponding one of said first and second bores from said knob, said stem including a threaded bore for receiving the threaded shank of the corresponding one of said first and second guide pins.

101. Apparatus according to claim 100, wherein the support collar of each of said first and second assemblies has an end and a radially outwardly extending shoulder axially spaced from said end, an annular recess axially inwardly adjacent said end, the corresponding drive roll having an inner end engaging said shoulder and an outer end adjacent said recess, and a resilient retaining ring in said recess engaging said outer end of the corresponding drive roll to removably mount said drive roll on said collar, said recess including circumferentially spaced end walls, and said retaining ring being radially expandable and contractible relative to said recess and having radially inwardly extending opposite end portions engaging against said end walls to limit radial expansion of said ring.

102. Apparatus according to claim 101, wherein said means for applying a biasing force against said first support shaft includes a lever supporting arm pivotal about a first arm axis transverse to said collar axis between first and second positions relative to said first support shaft, a lever mounted on said lever supporting arm for pivotal displacement about a lever axis which is parallel to said collar axis in said first position, said lever including an end spaced from said lever axis and a force transmitting element between said lever axis and said end, said first support shaft having an end spaced from said support member and engaged by said force transmitting element in said first position of said lever supporting arm, an adjusting rod mounted on said lever supporting arm and having a rod axis parallel to said first arm axis, said end of said lever extending across said rod, a stop on said rod, and a biasing spring on said rod between said stop and said end of said lever for biasing said force transmitting element against said end of said first support shaft, said rod being axially slidably supported on said lever supporting arm for displacing said stop toward and away from said end of said lever, and an adjusting knob threadedly interengaged with said rod for rotation of said knob to axially displace said rod to adjust the force of said spring against said end of said lever.

103. Apparatus according to claim 102, further including a shaft supporting arm mounted on said support member for pivotal displacement about a second arm axis transverse to said collar axis, said first support shaft having an inner end removably mounted on said shaft supporting arm for pivotal displacement therewith between a first position in which the collar axis of the first assembly is parallel to the collar axis of the second assembly and a second position in which the collar axis of the first assembly is at an angle to the collar axis of the second assembly, and spring means on said support member interengaging with said shaft supporting arm for holding the latter in each of said first and second positions thereof.

104. Apparatus according to claim 103, wherein said end of said first support shaft includes a force transmitting member having an outer end, an annular groove spaced axially inwardly of said outer end, and a tapered surface between said outer end and said groove, said force transmitting element on said lever engaging in said groove in said first position to releasable hold said lever supporting arm in said first position.

* * * * *

UNITED STATES PATENT AND TRADEMARK OFFICE
CERTIFICATE OF CORRECTION

PATENT NO. : 5,816,466
DATED : October 6, 1998
INVENTOR(S) : Seufer, et al.

It is certified that error appears in the above-identified patent and that said Letters Patent is hereby corrected as shown below:

Cover Page

Item [75], change "Inventor: Lee E. Seufer, Chardon, Ohio" to --Inventors: Lee E. Seufer, Chardon, Ohio; David J. Bender, Chesterland, Ohio; David W. Perrin, Wadsworth, Ohio; Eric Colburn, Wexford, Pennsylvania.--

Signed and Sealed this

Thirtieth Day of March, 1999

Attest:

Q. TODD DICKINSON

*Attesting Officer*   *Acting Commissioner of Patents and Trademarks*